Feb. 22, 1938.  C. C. FARMER ET AL  2,108,789
FLUID PRESSURE BRAKE
Filed Sept. 11, 1934    6 Sheets—Sheet 5
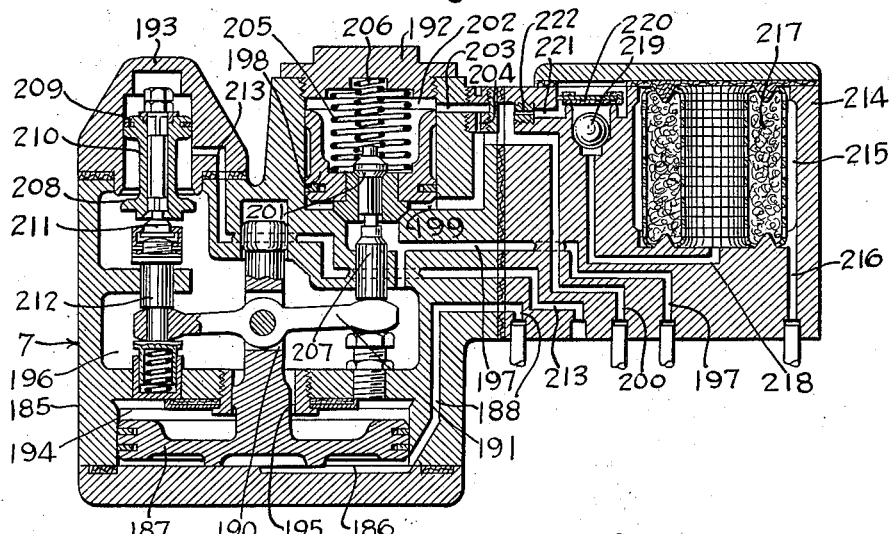
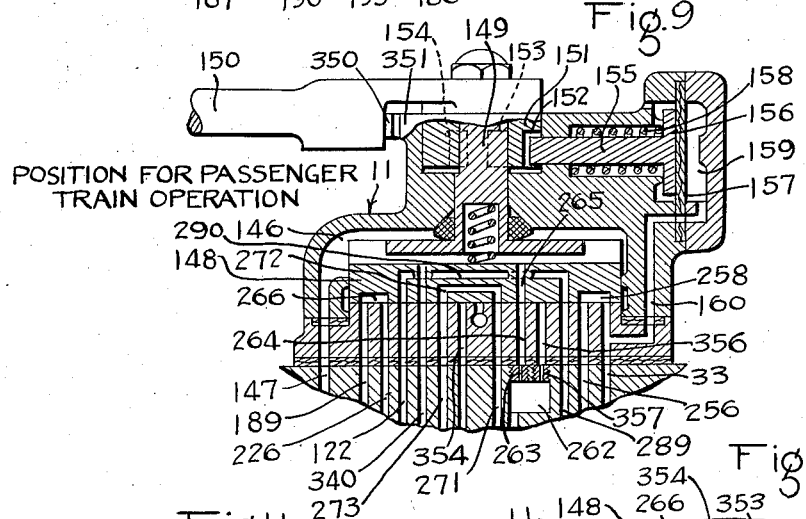
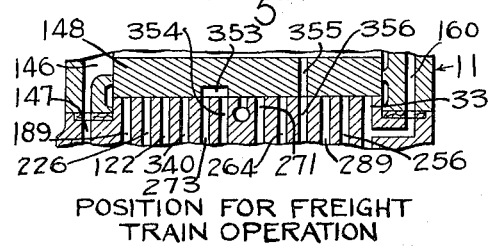
INVENTORS
CLYDE C. FARMER
ELLIS E. HEWITT
BY Wm. M. Cady
ATTORNEY

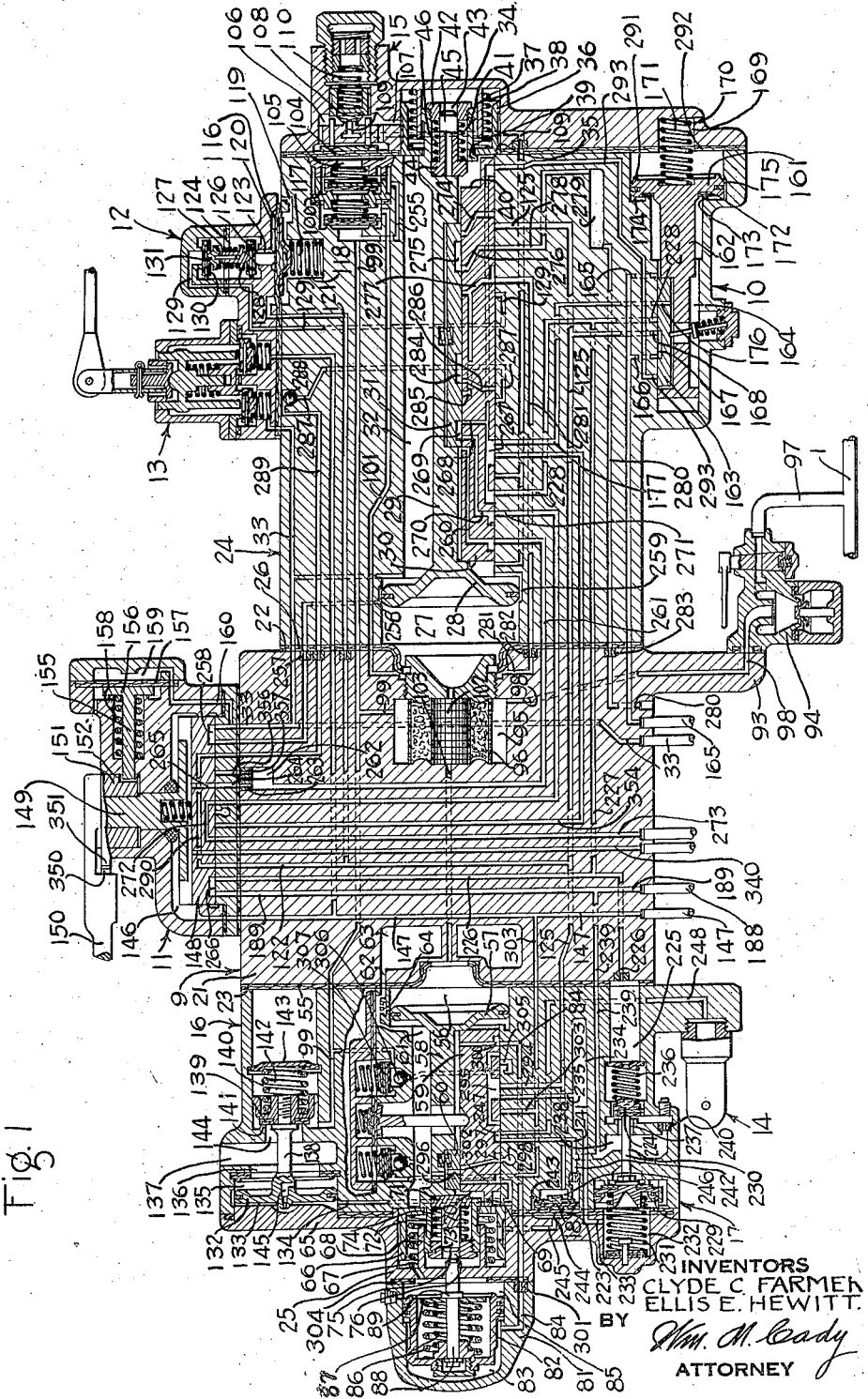

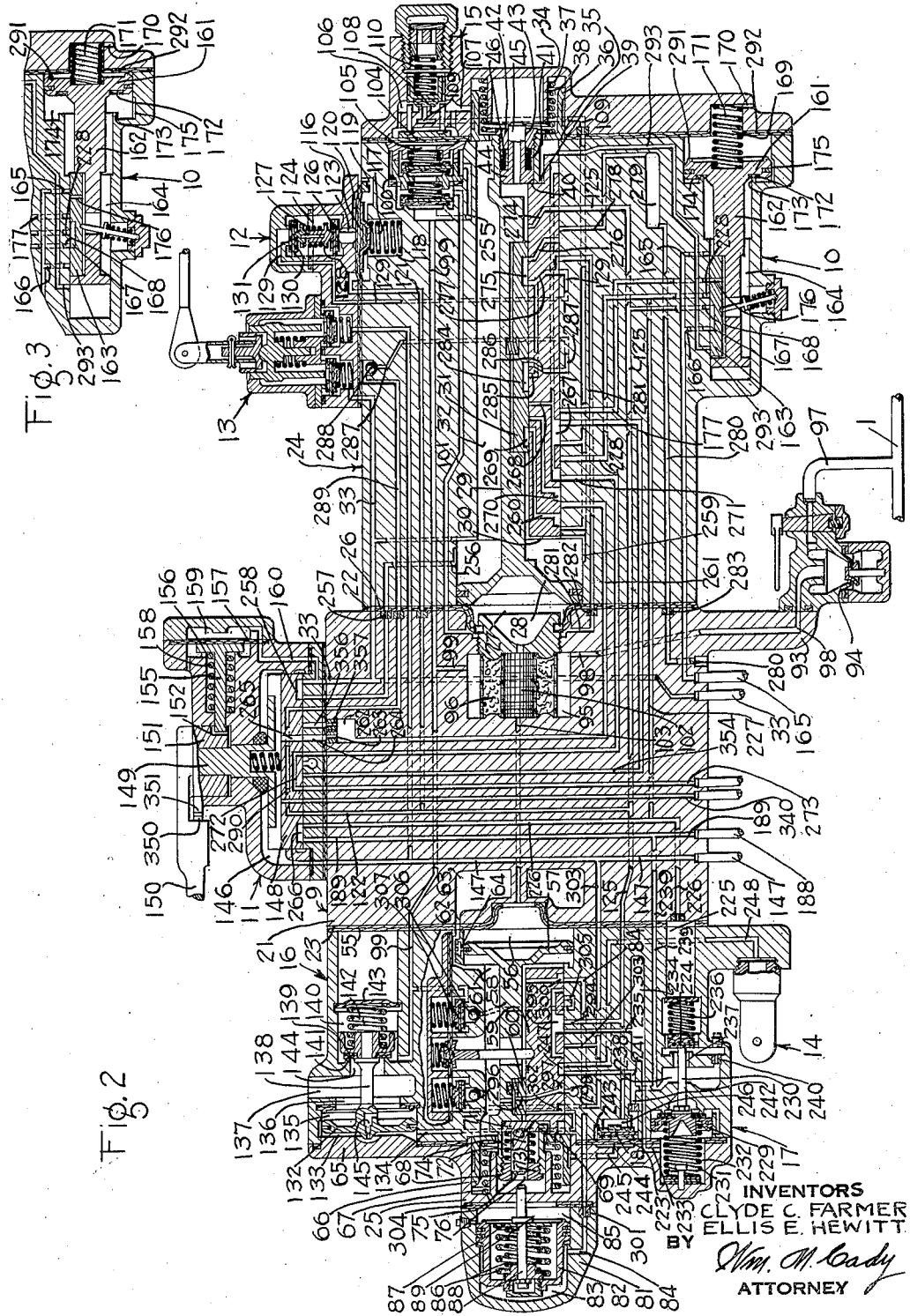

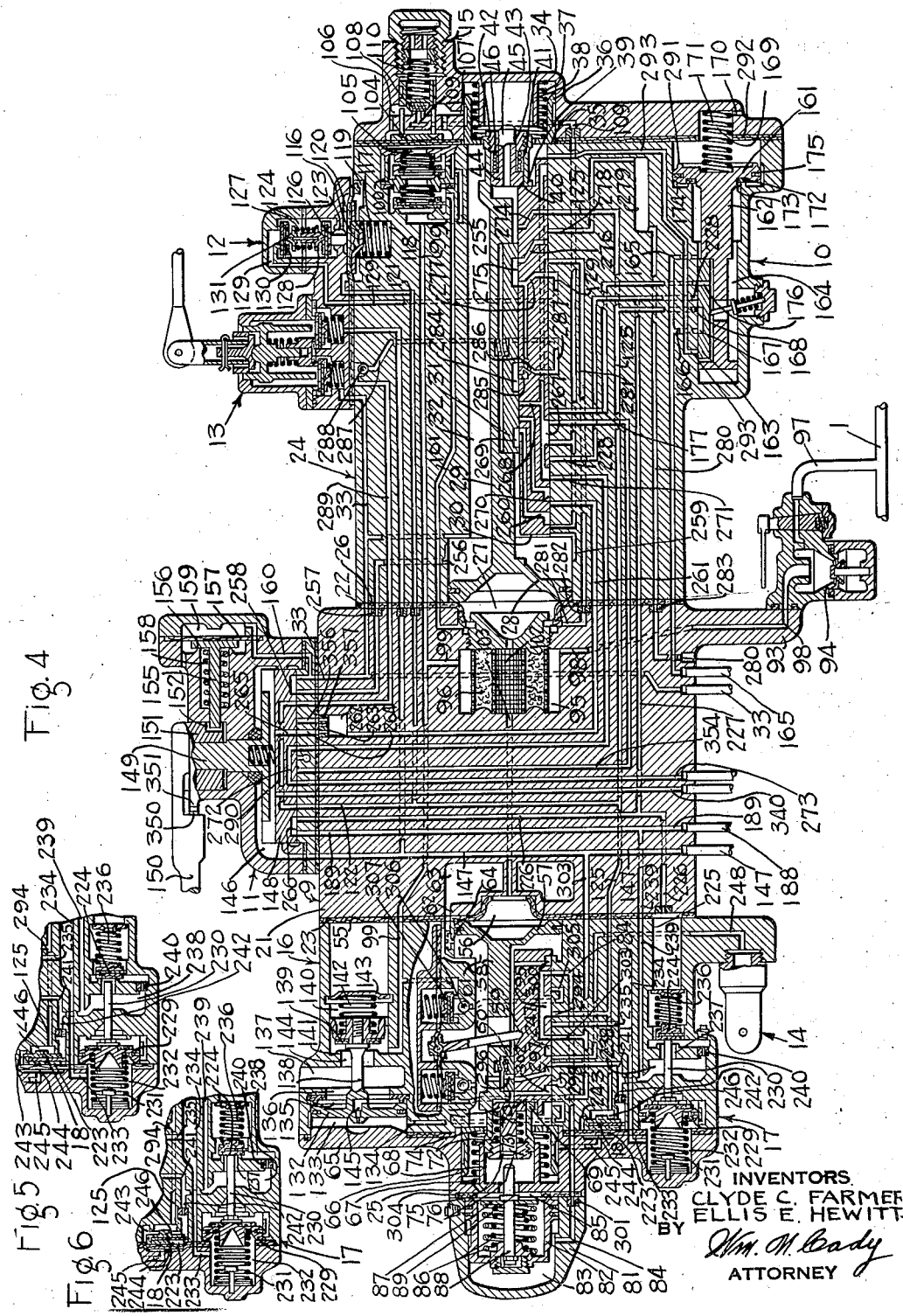

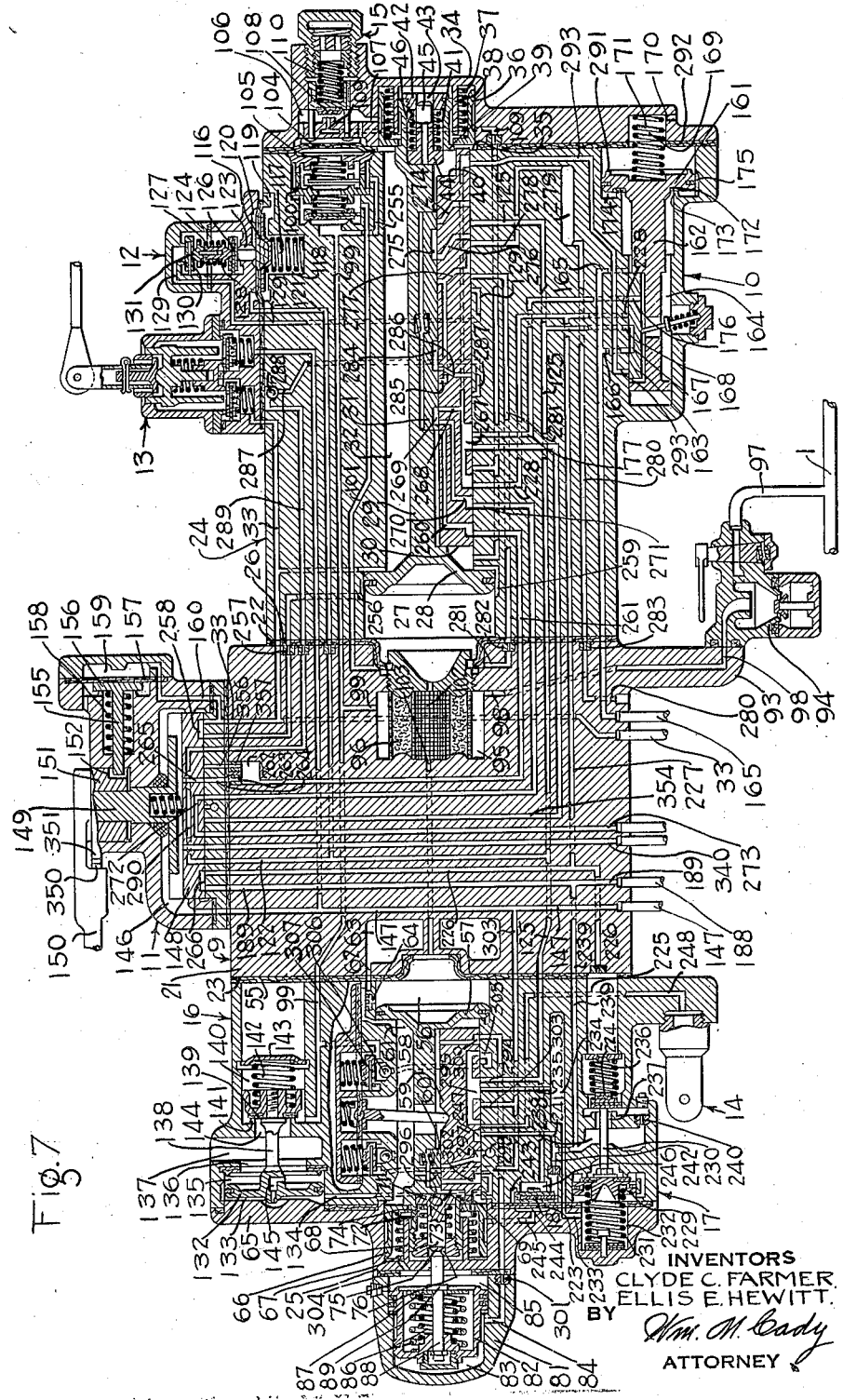

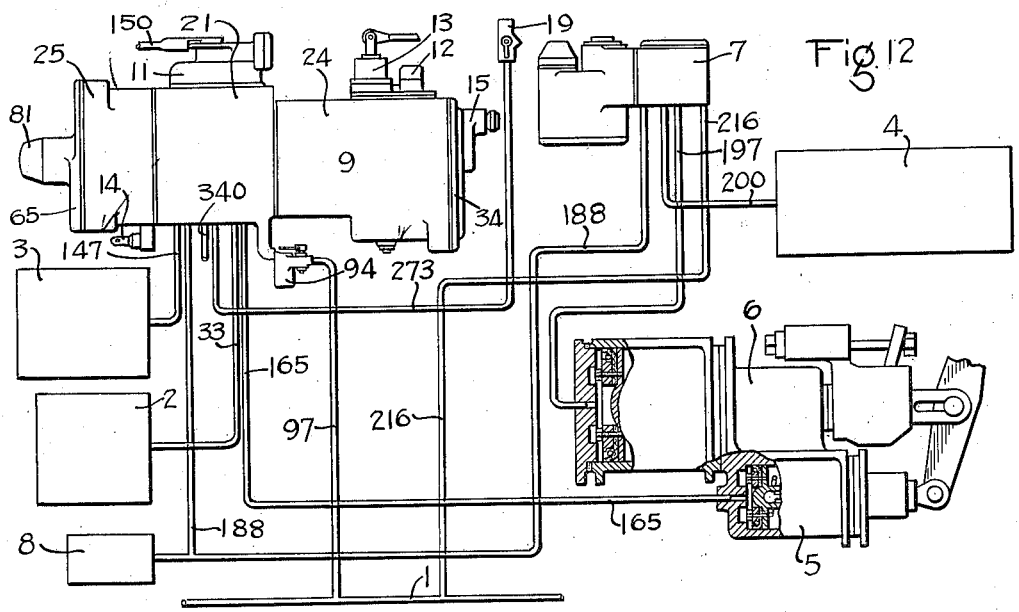

Patented Feb. 22, 1938

2,108,789

UNITED STATES PATENT OFFICE 2,108,789

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application September 11, 1934, Serial No. 743,546

91 Claims. (Cl. 303—23)

This invention relates to fluid pressure brakes, and more particularly to a fluid pressure brake equipment for controlling the application and release of the brakes on cars of a railway train.

The railroad companies have provided three very important classes of transportation service, namely, passenger, express or short freight, and long freight, and have designated and equipped certain cars for the particular service in which they are to be employed. It is well known, that the fluid pressure brake requirements of the three enumerated classes of service differ from each other to such an extent, that while a certain fluid pressure brake equipment may be adequate for one class of service, it may be entirely inadequate for the other two classes of service. This will be readily understood when it is remembered that passenger trains are comparatively short and operated on high speed schedules, that express trains are longer than passenger trains and are operated on speed schedules approaching passenger train schedules, and that freight trains are generally much longer than express trains and operate on slower speed schedules.

Modern transportation requirements are such that cars equipped for one of the aforementioned classes of service may also be employed in the other classes of service, so that under normal train operating conditions it is not uncommon for passenger, express and long freight trains to include passenger equipment cars, refrigerator cars and freight cars.

It has heretofore been the common practice to apply fluid pressure brake equipment designed for passenger service to the cars to be employed in express train service, but since passenger and express cars are sometimes included in long freight trains and the operating characteristics of passenger and freight brake equipments differ so much from each other, such equipments cannot operate in harmony with each other and therefore will not fully meet the present transportation requirements.

In passenger train operations, in order to provide the desired smoothness and flexibility of control of passenger trains, it is essential that the fluid pressure brake equipment on the cars of the train be operable to effect a graduated release of the brakes, but in express and long freight train operations the graduated release feature prohibitively slows up the release of the train brakes. Furthermore, cars having the graduated release feature cannot be operated in the middle or rear portions of either express or long freight trains, without undesired release graduations occurring when the direct release of the brakes is desired. From this it will be seen that a fluid pressure brake equipment to be suitable for use in passenger, express and long freight train service should be capable of being conditioned to provide the graduated release feature for passenger train operations and should also be capable of being conditioned to annul or eliminate the graduated release feature for express and long freight train service.

Another essential feature for both passenger and express train service, which is not suitable for long freight train operations, resides in the development of brake cylinder pressure in emergency applications of the brakes at the maximum possible rate. In long freight train operations, the rate of development of brake cylinder pressure in emergency is at a somewhat slower rate than the maximum possible rate employed in passenger or express train service, so as to insure the gentle gathering or closing of the slack in the train and thereby prevent excessive train shocks. The rapid development of brake cylinder pressure does not cause excessive slack gathering or closing shocks unless the train is of considerable length, therefore the maximum rate of increase in brake cylinder pressure possible may be effected in passenger and express train operations. From this it follows that a fluid pressure brake equipment to be used in passenger, express and long freight trains must be capable of being conditioned to provide in passenger and express train operations the fastest possible rate of brake cylinder pressure build-up in effecting an emergency application of the brakes and must also be capable of being conditioned to control the rate of build-up of brake cylinder pressure for long freight train operations.

The fluid pressure brake equipment employed on passenger equipment cars and express cars has a quick service feature of the continuous type, that is to say the local quick service flow of fluid from the brake pipe continues as long as the equalizing valve device remains in its brake pipe venting position and the brake pipe pressure exceeds the pressure of fluid in the brake cylinder or any other chamber into which fluid vented from the brake pipe flows. For freight service, however, continuous quick service is not desirable for the reason that under some not uncommon brake pipe leakage conditions, the amount of drop in brake pipe pressure on the cars at the head end of the train, due to the gradient in brake pipe pressure caused by such leakage is materially increased with the continuous type of quick service action, which results in an undesirable increase in the differential in brake cylinder pressures between the front and rear portions of the train. The quick service feature on express and long trains is a very essential one, but the amount of quick service venting must be limited or regulated so as to eliminate any possibility of the slack in the train from gathering or closing so harshly as to cause damaging shocks. In view of this, it will be understood that the fluid pressure brake equipment for cars which are to be used in passenger, express and long freight service should be capable of being conditioned to provide continuous quick service action for passenger service and a modified or limited quick service action for express and long freight service.

In passenger train operations a relatively fast rate of release of the brakes with the consequent quick recharge of the train brake equipment, is usually effected to secure the desired flexibility of control of the train, while in express and long freight service the rate of release of the brakes and the recharge of the train equipment should be slower than in passenger service to adequately control the outward movement or stretching of the slack in the train when the brakes are released while the train is in motion. It will thus be apparent that a fluid pressure brake equipment for cars which are to be used in passenger, express and long freight trains should be capable of being conditioned to provide the different rates of release and recharge noted.

The principal object of the present invention is to provide a fluid pressure brake equipment which is capable of meeting the hereinbefore mentioned passenger, express and freight train operating requirements.

According to this object the fluid pressure brake equipment is so constructed that it will have all of the operating characteristics of the "AB" type of freight brake equipment which is now standard for all freight brake equipment and in addition is provided with means for imparting other operating characteristics thereto to meet the requirements of passenger and express train service.

Another object of the invention is to provide a fluid pressure brake equipment which may be readily changed over or conditioned for passenger, express or freight train service.

Another object of the invention is to provide a fluid pressure brake equipment having means for rendering it suitable for different classes of train service and having means operative to condition the equipment for the desired class of service in which the equipment is to be employed.

Another object of the invention is to provide a fluid pressure brake equipment having means for rendering it suitable for different classes of service and having a change-over valve device for conditioning the equipment for the desired service in which it is to be employed, and a further object is to provide means for automatically locking the change-over valve device in any of its conditioning positions.

A further object of the invention is to provide a fluid pressure brake equipment, employing a take-up cylinder, with novel means for controlling the flow of fluid under pressure thereto and to the brake cylinder in effecting an application of the brakes.

In general, the present invention contemplates the attainment of the foregoing and other objects and advantages as will appear in the following more detailed description of the invention.

In the accompanying drawings, Fig. 1 is a diagrammatic view, mainly in section, of a fluid pressure brake equipment constructed in accordance with the invention, the equipment being shown in release position and conditioned for passenger train operations; Fig. 2 is a diagrammatic view similar to that shown in Fig. 1, but showing the equipment in service application position, the cut-in valve device being shown in position cutting off the fluid pressure supply to the relay valve device of the equipment; Fig. 3 is a diagrammatic sectional view of a portion of the equipment including the cut-in valve device which is shown in the position it assumes upon a predetermined increase in the pressure of fluid in a take-up cylinder; Fig. 4 is a diagrammatic sectional view similar to that of Fig. 1, but showing the equipment in emergency application position; Fig. 5 is a diagrammatic sectional view of a portion of the equipment showing the inshot valve mechanism in a position which it is adapted to assume to retard the flow of fluid to the relay valve device in effecting an emergency application of the brakes with the brake equipment changed over or conditioned for long freight train operations; Fig. 6 is a diagrammatic sectional view similar to Fig. 5, but showing the inshot valve mechanism in position to supply a final inshot of fluid to the relay valve device in effecting an emergency application of the brakes with the equipment changed over or conditioned for long freight train operations; Fig. 7 is a diagrammatic sectional view similar to that of Fig. 1, but showing the equipment in position to effect the graduated release of the brakes; Fig. 8 is a diagrammatic sectional view of the relay valve device embodied in the brake equipment; Figs. 9, 10, and 11 are diagrammatic sectional views of the change-over valve device, Fig. 9 illustrating the device in position for conditioning the equipment for passenger train operations, Fig. 10 illustrating the device in position for conditioning the equipment for express train operations, and Fig. 11 illustrating the device in position to condition the equipment for long freight train operations; Fig. 12 is a general piping diagram of the fluid pressure brake equipment; and Fig. 13 is a general piping diagram of a fluid pressure brake equipment embodying a modification of the invention.

As shown in the accompanying drawings, the equipment may comprise a brake pipe 1, an auxiliary reservoir 2, an emergency reservoir 3, a supply reservoir 4, a take-up cylinder device 5, a brake cylinder 6, a relay valve device 7, a volume reservoir 8, a brake controlling valve mechanism 9, a relay valve cut-in valve device 10, a change-over valve device 11, a quick service modifying or limiting valve device 12, a reservoir release valve device 13, a safety valve device 14, a release ensuring valve device 15, a quick action vent valve device 16, an inshot or relay piston chamber pressure build-up control valve mechanism 17, a timing valve 18, and a retainer valve device 19.

The brake controlling valve mechanism may comprise a pipe bracket 21 having gasket faces 22 and 23 disposed opposite each other and further comprises an equalizing valve device 24 and an emergency valve device 25.

The equalizing valve device 24 comprises a casing which is clamped to the gasket face 22 of the pipe bracket by any desired means, there being a gasket 26 interposed between the gasket face 22 and the clamping face of the casing. The equalizing valve casing has formed therein a piston chamber 27 containing a piston 28 having a stem 29 adapted to operate a main slide valve 30 and an auxiliary slide valve 31 contained in a valve chamber 32 which is connected to the auxiliary reservoir 2 through a passage and pipe 33.

The valve chamber 32 is closed by a cap 34 which is secured to the casing of the device by any desired means and which has a recess formed therein which defines the rear end portion of the chamber 32. This recess is of greater diameter than that of the major portion of the valve chamber and due to this the rear end of the casing forms a stop shoulder 35, against which a stop member 36, slidably mounted in the cap, is adapted to abut to limit inward movement of the member 36. Interposed between and engaging the stop member 36 and cap 34 is a spring 37 which at all times tends to move the member 36 toward the stop shoulder 35.

The rear end portion of the piston stem 29 extends through a central opening in the stop member 36 and is slidably guided in an annular lug 38, preferably formed integral with the cap 34 and extending into the valve chamber 32. The piston stem, at a point located a short distance inwardly from its rear end, is provided with a collar or lug 39, one side of which is adapted to be engaged by the stop member 36 and the other side of which is adapted to engage a rear end surface 40 of the main slide valve 30.

The rear end portion of the piston stem 29 is provided with a bore 41 which is closed at one end by a plug 42 having screw-threaded connection with the stem, said plug being provided with a central bore 43. Below the lower surface of the major portion of the piston stem, the other end of the bore 41 is open. The inner end wall of the bore 41 forms a stop shoulder adapted to be engaged by a plunger 44 which is in slidable engagement with the piston stem within the bore 41. The plunger is provided with a stem 45 which is slidably guided by the plug 42 within the bore 43. Interposed between and engaging one side of the plunger 44 and plug 42 is a spring 46 which acts to normally maintain the plunger in engagement with the end wall of the bore 43. In this position, the face of the plunger will be closer to the rear surface 40 of the main slide valve 30 than will be the outer face of the collar 39 of the piston stem, so that in effecting an application of the brakes, the plunger will engage the main slide valve and yieldably resist movement of the piston and auxiliary slide valve relative to the main slide valve before the collar 39 of the stem engages the main slide valve. The purpose of this is to stabilize the action of the equalizing valve parts, as will hereinafter more fully appear. This stabilizing mechanism also acts to assist in breaking the seal between the equalizing valve piston 28 and the gasket 26 in effecting the release of the brakes and further serves as a graduating spring for shifting the piston and auxiliary slide valve 31 from service position toward service lap position.

The emergency valve device 25 is quite similar in construction to the emergency valve device shown, described and claimed in United States Letters Patent of Clyde C. Farmer, No. 2,031,213, issued February 18, 1936, and differs therefrom in that it is provided with means for controlling a communication from the brake cylinder to the safety valve device 14, and with fluid pressure controlled means for controlling the movement of the emergency valve parts to their inner release or brake pipe charging position in releasing the brakes following an emergency application, all of which will hereinafter more fully appear.

The fluid pressure controlled means just referred to constitutes the subject matter of United States Letters Patent of Ellis E. Hewitt, No. 2,045,185, issued June 23, 1936.

Since the construction and functions of the present emergency valve device are, with but the two exceptions above noted, substantially identical with the emergency valve device of the above identified Farmer patent and with but the addition of the means for controlling the communication from the brake cylinder to the safety valve device, it is substantially identical with the emergency valve device of the hereinbefore mentioned Hewitt patent, the following description of the device will be more or less limited to the parts and functions necessary to a clear understanding of the invention.

Briefly described, the emergency valve device 25 may comprise a casing which is clamped to the gasket face 23 of the pipe bracket 21 by any desired means, there being a gasket 55 interposed between said face and the clamping face of the casing. This casing has formed therein a piston chamber 56 which contains an emergency piston 57 having a stem 58 adapted to operate a main slide valve 59 and an auxiliary slide valve 60 contained in a valve chamber 61 which is connected, through a passage 62, with a quick action chamber 63 provided in the pipe bracket 21. The piston chamber is normally open, as shown in Fig. 1 of the drawings, through a restricted passage in a choke plug 64, to the passage 62.

A cap 65 is secured to the rear end of the casing of the emergency valve device and has a recess formed therein which constitutes a portion of the emergency valve chamber 61. This recess is of greater diameter than that of the major portion of the valve chamber and, due to this, the rear end of the casing forms a stop shoulder against which a stop member 66, slidably mounted in the cap, is adapted to abut, and thus movement of the member 66 in the direction toward the casing is limited. Interposed between and engaging the cap 65 and stop member 66 is a spring 67 which, at all times, tends to move the stop member 66 toward the stop shoulder.

The rear end portion of the emergency piston stem 58 extends through a central opening in the stop member 66 and is slidably guided in an annular lug 68 integral with the cap 65.

The piston stem 58, at a point located a short distance inwardly from its rear end, is provided with a collar or lug 69, one side of which is adapted to be operatively engaged by the stop member 66 and the other side of which is adapted to operatively engage a rear end surface 70 of the main slide valve 59.

The rear end portion of the emergency piston stem 58 carries a mechanism which is quite similar in construction to the stabilizing mechanism carried by the rear end portion of the equalizing valve piston stem 29, and comprises a plunger 71 which is subject to the pressure of a spring 72 interposed between and engaging the plunger and a plug 73 having screw-threaded connection with the stem 58. The plunger is movable a limited distance relative to the stem 58 and is slidably guided within a bore 74 provided in the stem, and has a stem 75 which is slidable within a bore 76 provided in the plug 73. This mechanism is adapted to cooperate with the main slide valve 59 to stabilize the movement of the emergency valve parts in effecting applications of the brakes and is also adapted to cooperate with the slide valve to assist in shifting the emergency piston 57 out of sealing engagement with the gasket 55 in releasing the brakes after an emergency application.

Associated with the emergency valve device is a stop device 81 which is substantially the same as the stop device described and broadly claimed in the aforementioned Hewitt patent, and as clearly set forth in said patent, is for the purpose of insuring the movement of the emergency piston and slide valves to their inner or back-dump position in releasing the brakes following an emergency application, and for the purpose of preventing the emergency valve device from being unintentionally operated from its brake applying position by an increase in brake pipe pressure which may occur in a train where some of the cars are equipped with the brake controlling valve mechanism shown in the drawings and other of the cars are equipped with an old type of valve mechanism.

This stop device 81 is arranged at the rear of the emergency valve device in longitudinal alignment with the emergency piston and stem, and may comprise a casing which is secured to the cap 65 of the emergency valve device and which contains a piston 82.

At the rear end of the piston 82 there is a chamber 83 which is constantly open to a passage 84 leading to the seat of the emergency main slide valve 59, and at its forward end there is a chamber 85 which is in constant communication with the emergency valve chamber 61.

The piston 82 is provided with a recess which is open at the forward end of the piston and contains coil springs 86 and a follower plate 87 which is in operative engagement with the forward ends of said springs, and which is movable back and forth relative to the piston under the control of a plunger 88 which is carried by and movable relative to the piston, the plunger being provided with a collar 89 which operatively engages with the outer face of the follower. The plunger extends outwardly beyond the collar 89 and is adapted to engage the end of the plunger stem 75 and thereby the piston stem in releasing the brakes after an emergency application has been effected or when the brakes are held applied in emergency and the brake pipe pressure has been increased in the manner hereinbefore mentioned.

The pipe bracket 21 is provided with an extension 93 to which is secured the casing of a combined centrifugal dirt collector and cut-out cock device 94.

As shown in the drawings the pipe bracket is provided with a plurality of fluid conducting passages which lead to the several clamping faces of the bracket where they register with corresponding passages formed in the casings of the equalizing valve device 24, emergency valve device 25, device 94 and other devices which will be hereinafter described. The pipe bracket is also provided with a chamber 95 which contains an air strainer 96.

The brake pipe 1 is normally open to the strainer chamber 95 through a branch pipe 97, device 94 and a passage 98. Normally the chamber 95 is in communication through the strainer 96 with both the equalizing piston chamber 27 and the emergency piston chamber 56, but if the strainer should become clogged, fluid will be by-passed around the strainer, either to or from these piston chambers, by way of a passage 99, a double check valve device 100 mounted in the casing of the equalizing valve device and a passage 101 in constant communication with the equalizing piston chamber 27, said chambers being in constant communication through a central opening 102 in the strainer 96 and a passage 103 in the pipe bracket. The check valve device 100 is substantially the same in construction and operation as the corresponding device shown and described in the aforementioned Farmer patent and since the by-passing of fluid around the strainer in both the present and the Farmer patent is accomplished in substantially the same manner and since a full description of the check valve device is contained in said Farmer patent, a detailed description of the device in the present application is deemed unnecessary.

The release insuring valve device 15 is provided for the purpose of venting fluid under pressure from the auxiliary reservoir 2 when, in releasing the brakes, brake pipe pressure is increased to a predetermined degree in excess of auxiliary reservoir pressure, so as to facilitate the movement of the equalizing piston 28 and associated slide valves 30 and 31 to release position. Briefly described, this device comprises a flexible diaphragm 104, at one side of which there is a chamber 105 open, by way of the double check valve device 100, to the strainer containing chamber 95 and consequently to the brake pipe 1. At the other side of the diaphragm there is a chamber 106 open through a passage 107 to the valve chamber 32 of the equalizing valve device. Contained in the chamber 106 is a valve 108 which is operative to control communication from the chamber 106 to a vent passage 109 leading to the seat of the main slide valve 30 of the equalizing valve device, said valve being normally held closed by the action of a spring 110. The diaphragm is subjected, as will be understood, to the opposing pressures of the brake pipe and auxiliary reservoir and is operable to control the operation of the valve 108.

The quick service modifying or limiting valve device 12 is carried by the casing of the equalizing valve device 24 and is provided for the purpose of limiting the local quick service reduction in brake pipe pressure in effecting an application of the brakes with the equipment changed over or conditioned for either long freight or express train operation to insure the development of a predetermined but light brake cylinder pressure upon a light reduction in brake pipe pressure being effected through the medium of the brake valve device (not shown). With the equipment changed over or conditioned for passenger operation, the limiting valve device, although it will operate in the same manner as when the equipment is conditioned for either freight or express service, will not, as will hereinafter appear, limit the quick service flow of fluid from the brake pipe, but will act to retard the rate of the quick service reduction in brake pipe pressure. This quick service modifying or limiting valve device may comprise a flexible diaphragm 116 which is subject on one side to the action of a spring 117 contained in a chamber 118 constantly open, through a passage 119, to the atmosphere. At the other side of the diaphragm there is a chamber 120 which is connected through connected passages 121 and 122 to an application passage 125.

The chamber 120 is normally open through a passage 123 to a valve chamber 124 containing a limiting valve 126 which is adapted to be seated to close communication from the chamber 124 to the chamber 120, said valve being subject to the action of a spring 127, which, acting through the medium of a plunger 128, tends to urge the valve toward its seat. Leading from the seat of the main slide valve 30 to the valve chamber 124 is a quick service passage 129, and contained in the valve chamber is a check valve 130 which is adapted to prevent back flow of fluid from the chamber to the passage 129, said spring 127 acting through the medium of a plunger 131 to urge the check valve toward its seat.

The reservoir release valve device 13 is carried by the casing of the equalizing valve device 24 and is manually operative to vent fluid under pressure from the auxiliary reservoir or from both the auxiliary reservoir and emergency reservoir, to effect the release of the brakes independently of the brake valve device under certain train operating conditions. This device is of substantially the same construction and functions in substantially the same manner as the reservoir release valve fully disclosed in United States Letters Patent to Ellis E. Hewitt, Nos. 2,012,717 and 2,012,718, issued August 27, 1935, and in view of this, a detailed description of the device here is deemed unnecessary.

The quick action vent valve device 16 is associated with the emergency valve device 25 and is mounted in the emergency valve casing. This device 16 may comprise a quick action piston 132, at one side of which is a piston chamber 133 to which fluid under pressure is adapted to be supplied by way of a passage 134 when an emergency application of the brakes is initiated. At the other side of the piston there is a chamber 135 which is open to the atmosphere through an opening 136 and a passage 137 in the casing. The piston 132 is operatively connected by a stem 138 to a brake pipe vent valve 139 contained in a chamber 140 to which the brake pipe is connected by way of the strainer recess 95 in the pipe bracket and passage 99. The valve 139 is normally maintained seated on a seat rib 141 by the action of a spring 142 contained in the valve chamber 140 and interposed between said valve and a spring seat 143 carried by the casing. Thus the valve closes communication through a vent passage 144 leading from the valve chamber 140 to the atmospheric passage 137. The piston 132 is provided with the usual small vent port 145 for controlling the rate of flow of fluid from the quick action chamber to the atmosphere upon the initiation of an emergency application of the brakes.

The change-over valve device 11 is provided for the purpose of conditioning the equipment for either passenger, express or long freight train operation, and as illustrated, may comprise a casing which, in the present embodiment of the invention, is secured to the pipe bracket 21. This casing has a valve chamber 146 formed therein which is constantly connected through a passage and pipe 147 to the emergency reservoir 3. Contained in the chamber 146 is a rotary change-over valve 148 to which is operatively connected a rotatable operating stem 149 having an operating handle 150 secured thereto. Mounted on the stem 149, so as to be rotatable therewith and journaled in the casing, is a sleeve 151 having radially spaced locking notches 152, 153 and 154 formed therein for the reception of the end of a locking bolt 155 which is slidably mounted in the casing for movement into or out of the locking notch which may be in registration with the locking bolt. The locking bolt is provided with a follower portion 156 which is adapted to be operatively engaged by a flexible diaphragm 157 for controlling the operation of the locking bolt. Interposed between and engaging the follower 156 and the casing is a spring 158 which, at all times, tends to urge the locking bolt toward its unlocking position. At the side of the diaphragm opposite the follower 156 there is a chamber 159 which is constantly connected through passages 160 and 33 to the auxiliary reservoir 2.

The cut-in valve device 10 is associated with the equalizing valve device and is mounted in the casing thereof. This valve device 10 is for cutting the relay valve device 7 into action and may comprise a piston 161 having on one side a stem 162 adapted to operate a slide valve 163 contained in a valve chamber 164 which is normally connected through a passage and pipe 165 to the take-up cylinder 5, said passage 165 being normally connected to the passage 125 by way of a branch passage 166, a cavity 167 in the slide valve 163 and a passage 168. The valve chamber is normally connected through a port 176 to a passage 177 leading to the slide valve seat of the equalizing valve device 24. At the other side of the piston is a chamber 169 which is open to the atmosphere through a passage 170 and which contains a spring 171 which, at all times, tends to urge the piston to its normal position. The piston on its stem side is provided with a gasket 172 which is adapted to engage an annular seat rib 173 on the casing when the piston is in its normal position and thus closes communication from the valve chamber 164 to a space 174 surrounding the seat rib 173, which space is connected to the chamber 169 through a groove 175 which by-passes the piston.

The relay valve device 7 is provided for the purpose of controlling the supply of fluid under pressure to and the release of fluid under pressure from the brake cylinder 6 and is preferably located as close to the brake cylinder as practical, so that the volume of the communication from the device to the brake cylinder will be so small that it will not materially retard the rate of increase in brake cylinder pressure in effecting an application of the brakes.

The relay valve device 7 may be of any desired type, but as shown in the drawings is preferably of the same general type as that which constitutes the subject matter of United States Letters Patent to Ellis E. Hewitt, No. 2,096,491, issued October 19, 1937. Since this type of relay valve device has been fully described in this Hewitt patent a full detailed description here of the device is deemed unnecessary.

Briefly described, the relay valve device 7 in the present embodiment of the invention comprises a casing 185 having a piston chamber 186 containing a control piston 187 and connected through a passage and pipe 188 to the volume reservoir 8 and to a passage 189 leading to the seat of the rotary valve 148 of the change-over valve device 11. The piston 187 is provided with a stem 190 having a valve controlling lever 191 rockably mounted thereon for controlling the operation of a brake cylinder supply valve mechanism 192 and a brake cylinder exhaust valve mechanism 193. At the stem side of the piston there is a chamber 194 which is connected through a small or flow restricting communication 195 to a chamber 196 connected through a passage and pipe 197 to the brake cylinder 6, said chamber 196 containing the valve controlling lever 191.

The supply valve mechanism 192 comprises a piston valve 198 which is operative to control the flow of fluid from a chamber 199 to the chamber 196, with which chamber 199 the supply reservoir 4 is in constant open communication through a pipe and passage 200. Mounted in the piston valve and movable relative thereto a limited distance, is a pilot supply valve 201 which is adapted to control communication through the piston valve from a valve chamber 202 to the chamber 196, said chamber 202 being in constant open communication, by way of passage 203 and a restricting passage in a choke plug 204, with the supply passage 200. Contained in the valve chamber 202 are springs 205 and 206 which tend to urge the valve piston 198 and pilot valve 201, respectively, toward their seats, said springs acting to normally maintain the valves seated. The supply mechanism also comprises a plunger 207 which is slidably mounted in the casing and which cooperates with one arm of the lever 191 and the valves 198 and 201 to control the operation of said valves.

The exhaust valve mechanism 193 may comprise an exhaust valve 208 having a piston 209 connected therewith by means of a stem 210 and also comprises a pilot or unloading valve 211 which is slidably mounted in the exhaust valve member so as to be movable a limited distance relative thereto. The valve 208 is operative through the medium of the lever 191, a plunger 212 and the valve 211 to control communication from the chamber 196 to a passage 213 leading to the atmosphere.

Secured to the casing of the relay valve device is a casing section or extension 214 having passages formed therein which form extensions of the passages 188, 197, 200 and 213. The casing section 214 is also provided with a chamber 215 to which the brake pipe 1 is connected through a supply reservoir charging pipe and passage 216. Contained in the chamber 215 is an air strainer 217 through which fluid under pressure is adapted to flow to the supply reservoir passage 200 by way of a passage 218, past check valves 219 and 220 which are arranged in series with each other, a passage 221 and a restricting passage in a choke plug 222 having screw-threaded connection with the casing section 214, said check valves being adapted to prevent back flow of fluid from the supply reservoir to the brake pipe 1.

The inshot or relay piston chamber pressure build-up control valve mechanism 17 is associated with the emergency valve device 25 and is mounted in the emergency valve casing. This mechanism, as will hereinafter more fully appear, is operative in effecting an emergency application of the brakes only when the equipment is changed over or conditioned for long freight train operations to effect the operation of the relay valve device 7, to provide an initial inshot of fluid to the brake cylinder until a predetermined brake cylinder pressure (about fifteen pounds) is developed and to then restrict the rate of flow of fluid to the brake cylinder 6. In other words, the mechanism 17 functions to pilot the action of the relay valve device 7 in effecting an application of the brakes until such time as the timing valve 18 which is controlled through the medium of a flexible diaphragm 223 operates, as will hereinafter more fully appear, to provide a final inshot of fluid to effect the operation of the relay valve device to provide a final inshot of fluid to the brake cylinder 6. The valve mechanism 17 is quite similar in construction to the inshot valve mechanism fully described in the aforementioned Farmer application, and briefly described, may comprise a poppet valve 224 which is contained in a chamber 225 connected to a restricted passage 226 leading to the rotary valve seat of the change-over valve device 11. At a point intermediate the restriction in the passage 226 and the change-over valve device 11, the passage 226 is connected through a passage 227 to a passage 228 leading to the seat of the main slide valve 30 of the equalizing valve device and to the seat for the slide valve 163 of the brake cylinder cut-in valve device 10. This inshot mechanism also comprises a valve piston 229 having a stem 230 through the medium of which the valve 224 is controlled. Normally the valve piston 229 is maintained in sealing engagement with the casing by the action of a spring 231 contained in a piston chamber 232 which is connected through a passage 233, and a small volume chamber 234 to a passage 235 leading to the seat for the main emergency slide valve 59, and when in this position, the stem 230 maintains the valve 224 unseated against the action of a spring 236 tending to seat the valve.

With the poppet valve 224 unseated, the valve chamber 225 is open to the volume reservoir 8 and consequently to the piston chamber 186 of the relay valve device 7 by way of a passage 237, a chamber 238, a passage 239, passage 189 and pipe 188. The valve chamber 225 is also connected to the chamber 238 and consequently to the relay piston chamber by way of a restricting passage in a choke plug 240 having screw-threaded connection with the casing.

The chamber 238 of the valve mechanism 17 is also connected to a passage 241 which leads to the seat for the emergency main slide valve 59 and which is connected through a restricted passage 242 to a valve chamber 243 at one side of the flexible diaphragm 223 and containing the timing valve 18. At the other side of the diaphragm there is a chamber 244 which is connected through a passage 245 with the emergency valve chamber 61. The inner seated area of the valve 18 is exposed to a chamber 246 connected with the passage 125.

The safety valve device 14 is of the usual construction employed in universal valve devices and is for the purpose of venting fluid under pressure from the volume reservoir 8 and relay piston chamber 186 to thereby limit the brake cylinder pressure when the equipment is conditioned for passenger train operation and an over reduction in brake pipe pressure is effected in making a service application of the brakes, the flow of fluid to the safety valve device being by way of passage 241, a cavity 247 in the emergency main slide valve 59 and a passage 248. The safety valve is set to vent fluid from said reservoir and piston chamber when the pressures therein have been increased to around sixty-three pounds. By thus limiting the pressure in the reservoir and chamber, the relay valve device 7 will function to correspondingly limit the brake cylinder pressure. This safety valve device only functions to limit the degree of fluid pressure build-up in the volume reservoir 8 and relay piston chamber 186 in effecting a service application of the brakes with the equipment conditioned for passenger service and is rendered inoperative by the emergency valve device when an emergency application is initiated.

The take-up cylinder device 5 is associated with the brake cylinder 6 and may be of substantially the same construction and for the same purpose as the corresponding device disclosed in United States Letters Patent of Clyde C. Farmer No. 2,004,654, issued June 11, 1935. This device, as will hereinafter more fully appear, is adapted to operate to take up slack in the brake rigging and to move the usual brake shoes into light engagement with the car wheels before the brake cylinder 6 is caused to operate to apply braking force to the brake rigging.

*Initial charging with the change-over valve device in position to condition the equipment for passenger train operations*

Assuming the change-over valve device 11 to be in position to condition the equipment for passenger train operations and the numerous parts and devices of the equipment to be in the position in which they are shown in Fig. 1, fluid under pressure supplied to the brake pipe 1 in the usual manner through the medium of a brake valve device (not shown), flows therefrom through pipe 97, the communication through the combined centrifugal dirt collector and cut-out cock device 94, passage 98, chamber 95 and through the strainer 96 to both the equalizing piston chamber 27 and emergency piston chamber 56. From the strainer chamber 95 fluid under pressure flows through passage 99 to the quick action vent valve chamber 140 and to the double check valve device 100. From the passage 99 fluid under pressure flows past the double check valves by way of a passage 255 to chamber 105 at one side of the flexible diaphragm 104 of the release insuring valve device 15.

Fluid under pressure supplied to the equalizing piston chamber 27 flows by way of passage 101 to a chamber between the two check valves of the device 100. With the strainer 96 in condition to permit the free passage of fluid therethrough to the piston chamber 27, the pressures of fluid on opposite sides of each of these check valves will be increased at substantially the same rate, so that the check valves will be maintained seated as shown in the drawings. If, however, the strainer is clogged, the pressure of fluid supplied through the passage 99 will be increased at a faster rate than it can be increased by the flow of fluid through the passage 101, with the result that one of the check valves will be unseated and permit the free flow of fluid from the passage 99 to the passage 101 and consequently to the equalizing piston chamber 27 and also to the emergency piston chamber 56.

Fluid under pressure supplied to the equalizing piston chamber 27 flows therefrom to the auxiliary reservoir by way of a passage 256, the restricting passage in a choke plug 257 interposed in the passage, a cavity 258 in the rotary valve 148 and the auxiliary reservoir passage and pipe 33. Fluid under pressure also flows from the piston chamber through a feed groove 259 to the equalizing valve chamber 32 and from thence flows directly to the passage 33 and to the valve chamber 106 of the release insuring valve device 15. It will here be noted that the charging rate of the auxiliary reservoir, equalizing valve chamber 32 and valve chamber of the release insuring valve device is controlled by the combined flow areas of the passage in the choke plug 257 and feed groove 259. With the change-over valve in position to condition the equipment for express operations or in position for long freight train operations, the change-over rotary valve laps the auxiliary reservoir charging passage 256, so that the charging rate is regulated according to the flow area of the feed groove alone. From this it is obvious that the rate at which the auxiliary reservoir, equalizing valve chamber and release insuring valve chamber 106 are charged or recharged is faster than the rate of charge when the equipment is conditioned for either express or long freight operations. This fast rate of charge or recharge in passenger operations is highly desirable for the reason that the demand on the stored fluid pressure is considerably greater than in either express or long freight operations. Passenger trains are comparatively short, and due to this, the rapid rate of charge of the auxiliary reservoir and the other above mentioned connected volumes will not materially retard the charging rate toward the rear end of the train as would be the case in a long train.

Fluid under pressure flows from the passage 33 through passage 160 to the diaphragm chamber 159 and causes the diaphragm to flex and shift the locking bolt 155 into locking engagement with the sleeve 151 against the opposing action of the spring 158, thus locking the change-over valve device in position for passenger train operations. It will be understood that the spring is of such a value that it will be overpowered by the action of the diaphragm 157 when the pressure of fluid in chamber 159 has been increased to around twenty pounds or any other desired pressure.

Fluid under pressure also flows from the equalizing valve chamber 32 to the emergency reservoir 3 by way of a port 260 in the main slide valve 30 of the equalizing valve device, a passage 261, a small chamber 262, the restricting passage of a choke plug 263, a passage 264, a port 265 in the rotary valve 148 of the change-over valve device 11, rotary valve chamber 146 and passage and pipe 147.

Fluid under pressure supplied to the emergency piston chamber 56 flows by way of the restricting passage of the choke plug 64 to the passage 62 and therethrough to the quick action chamber 63 and emergency valve chamber 61, and from the chamber 61 fluid flows through a port 300 in the emergency main slide valve 59, passage 84 and choke plug 301 to the piston chamber 83 of the stop device 81. Fluid under pressure also flows from the valve chamber 61 through passage 245 to the chamber 244 and fluid in this chamber acting on the flexible diaphragm 223 maintains the timing valve 18 seated. The flow area of the passage in the choke plug 301 is such that the rate of increase in the pressure of fluid in the chamber 83 will not exceed the rate of increase in the emergency valve chamber 61, so that the piston 82 will remain in its normal position.

Fluid under pressure flows from the brake pipe 1 to the supply reservoir 4 by way of pipe and passage 216, chamber 215 in the relay valve device 7, strainer 217, passage 218, past the check valves 219 and 220, restricting passage in the choke plug 222, and passage and pipe 200. Fluid supplied to the passage 200 also flows to the chamber 199 at one side of the piston valve 198 and flows to the chamber 202 at the other side thereof by way of the restricting passage in the choke plug 204.

With the numerous parts and devices of the equipment in brake releasing position, the volume reservoir 8 and piston chamber 186 of the relay valve device are connected with the atmosphere by way of pipe 188, passage 189, a cavity 266 in the change-over rotary valve 148, passages 226, 227 and 228, a cavity 267 in the equalizing main slide valve 30, a port 268 in the main slide valve, a cavity 269 in the auxiliary slide valve 31, a port 270 in the main slide valve, a passage 271, a cavity 272 in the change-over rotary valve 148 and an exhaust passage 273.

The valve chamber 164 of the cut-in valve device 10 and consequently the take-up cylinder which is connected to said chamber through pipe and passage 165 are connected to the atmosphere by way of port 176 in the slide valve 163, passage 177, cavity 267 in the equalizing main slide valve 30 and the communication above traced from the cavity 267 to the atmosphere.

The diaphragm chamber 120 of the quick service limiting valve device 12 and connected valve chamber 124 of the device are connected with the atmosphere by way of passages 121, 122, 125, and 168, cavity 167 in the cut-in valve device 10, passage 166, passage 165, valve chamber 164 of the cut-in valve device and the communication hereinbefore traced from the chamber 164 to the atmosphere.

The brake cylinder 6 is connected with the atmosphere by way of pipe and passage 197, chamber 196 of the relay valve device 7, past the open exhaust valve 208 and passage 213.

*Service application of the brakes with the equipment conditioned for passenger train operations*

When it is desired to effect a service application of the brakes, a gradual reduction in brake pipe pressure is effected through the medium of a brake valve device (not shown), which reduction causes a corresponding reduction in the pressure of fluid in both the equalizing piston chamber 27 and the emergency piston chamber 56. The reduction in pressure of fluid in chamber 27 will be at a faster rate than fluid under pressure can flow thereto from the auxiliary reservoir 2 by way of the choked passage 257 and feed groove 259, so that the pressure of fluid in equalizing slide valve chamber 32 causes the equalizing piston 28 to move outwardly in a direction toward the left hand, said piston, through the medium of the piston stem 29 shifting the auxiliary slide valve 31 relative to the main slide valve 30.

As the auxiliary slide valve is thus shifted it laps the port 260 in the main slide valve, thus closing the communication between the valve chamber 32 and the emergency reservoir 3 and also laps the release port 268 in the main slide valve at substantially the same time as the port 260 is closed by the auxiliary slide valve. The equalizing piston 28 closes communication from both the feed groove 259 and passage 256 to the chamber 27, so as to prevent back flow of fluid under pressure from the auxiliary reservoir and valve chamber 32 to the piston chamber 27. After the feed groove 259 and passage 256 are thus closed, the continued movement of the piston causes the rear end of the auxiliary slide valve 31 to uncover a service port 274 in the main slide valve 30, following which, the plunger 44, mounted in the rear end of the piston stem 29, engages the rear surface 40 of the main slide valve. The further outward movement of the auxiliary slide valve by the piston 28 and relative to the main slide valve is now resisted by the spring 46 acting through the piston stem. Now, when a predetermined light reduction in brake pipe pressure has been effected, say for instance about one pound, a sufficient fluid pressure differential is created on the piston 28, that the piston will be caused to move outwardly, overcoming the resistance offered by the spring 46 and shifting the auxiliary slide valve to initial quick service position. The piston 28 is very sensitive to pressure differentials and, therefore, quickly responds to a light but predetermined brake pipe reduction to move the auxiliary slide valve 31 relative to the main slide valve to close the port 260, and to close the feed groove 259 and passage 256, and to then move the auxiliary slide valve to quick service position.

In the initial quick service position of the auxiliary slide valve 31, a cavity 275 in said valve connects a quick service port 276 in the main slide valve 30 to a quick service port 277 also in the main slide valve. At the seat of the main slide valve 30, the port 276 is connected to a passage 278 leading to a small quick service chamber or bulb 279 which is in constant open communication through a restricted passage 280 with the atmosphere, and the port 277 is connected to a passage 281 which is at all times open to the piston chamber 27 and consequently to the brake pipe. With the ports 276 and 277 thus connected to each other, fluid under pressure is permitted to flow from the brake pipe to the quick service bulb 279 at a fairly fast rate as governed by the flow area of the passage in a choke plug 282 interposed in the passage 281 and from said bulb is permitted to flow to the atmosphere at a slower rate by way of the passage 280, the rate of flow of fluid from the bulb being governed by the flow area of the passage in a choke plug 283 interposed in the passage.

It will be noted that the initial local quick service flow of fluid from the brake pipe is at a fast rate until such time as the brake pipe pressure substantially equalizes into the bulb 279 and then continues at a slower rate to the atmosphere. The initial flow of fluid to the bulb produces a sudden but limited quick service reduction in brake pipe pressure for hastening the operation of the equalizing valve device on the next car in a train. The equalizing valve device on said next car then operates in a similar manner, and in this way, a quick serial response to the brake pipe reduction is transmitted from one car to the next throughout the length of the train.

After this sudden limited reduction in brake pipe pressure to the quick service bulb, the quick service reduction is adapted to continue at the slower rate. This continued reduction is for the purpose of insuring movement of the local equalizing valve parts to service position.

With the auxiliary slide valve 31 in initial quick service position, a cavity 284 in the valve connects a branch port 285 of the quick service port 277 to a final quick service port 286 in the main slide valve 30, which port 286 is lapped at the seat for the main slide valve.

When the equalizing piston 28 and auxiliary slide valve 31 move to the initial quick service position, the lug 39 on the piston stem 29 engages the rear surface 40 of the main slide valve 30, so that upon further movement of the piston toward service position, the main slide valve will be shifted in the same direction to service position in which the piston seats on the gasket 26.

As the main slide valve 30 is being shifted toward service position, communication between the quick service port 276 and the quick service passage 278 is disestablished, thus closing off any further quick service flow of fluid from the brake pipe to the atmosphere by way of the bulb 279. The quick service port 277 is provided with a cavity which is of such a length that it is at all times open to the passage 281 leading from the equalizing piston chamber.

After the quick service port 276 has been lapped, the continued movement of the main slide valve 30 causes the service port 274, which has been previously uncovered by the auxiliary slide valve, to be cracked open to the passage 125, so that fluid under pressure now starts to flow from the equalizing valve chamber 32 and connected auxiliary reservoir to the take-up cylinder 5 by way of port 274, passages 125 and 168, cavity 167 in the slide valve 163 of the cut-in valve device 10, passage 166 and passage and pipe 165. Fluid under pressure also flows through passage 165 to the valve chamber 164 of the cut-in valve device 10. Immediately following this, the quick service port 277 is cracked open to the quick service passage 129 and the quick service port 286 in the main slide valve is cracked open to a quick service passage 287 which is connected to the passage 125 past a ball check valve 288, a choked passage 289, a cavity 290 in the change-over rotary valve 148 and passage 122. It will here be seen that since, as just described, the passage 125 is in open communication with the take-up cylinder and valve chamber of the cut-in valve device 10, the quick service flow of fluid from the brake pipe will be to said cylinder and chamber upon the initiation of the flow of fluid to effect an application of the brakes.

It will here be understood that the flow of fluid from the equalizing valve chamber 32 and connected auxiliary reservoir to the take-up cylinder 5 and valve chamber 164 through the cracked open service port will be at such a slow rate that the effect of the resulting reduction in auxiliary reservoir pressure on the continued movement of the equalizing piston 28 toward service position will be negligible. The reason for thus opening the service port before permitting the final quick service flow of fluid from the brake pipe to begin is to effect a reduction in auxiliary reservoir pressure before the pressure in the take-up cylinder and chamber 164 is increased by the quick service flow of fluid. In this connection it will be noted that if the final quick service flow of fluid from the brake pipe were permitted to take place before the service port were opened and the equalizing valve parts should for any reason come to a stop before the service port is opened, the quick service flow of fluid from the brake pipe would build up the fluid pressure in the take-up cylinder and cut-in valve chamber, and since no reduction in auxiliary reservoir pressure could occur, fluid under pressure could not be released from said cylinder and chamber upon an increase in brake pipe pressure. By arranging the ports in the manner just described, a reduction in auxiliary reservoir pressure will occur before the final quick service flow of fluid from the brake pipe takes place, so that the above referred to objectionable feature is not present in the present embodiment of the invention.

The equalizing piston 28 and slide valves 30 and 31 continue to move to service position in which the piston seals on the gasket 26. With the main slide valve in service position, the service port 274 is fully open to the passage 125 and the quick service port 277 is fully open to the passages 281 and 129 and the quick service port 286 is fully open to the passage 287 leading to the passage 125 which is connected to the take-up cylinder 5 and slide valve chamber 164 of the cut-in valve device 10.

Fluid under pressure vented from the brake pipe, by way of the quick service communication in the equalizing and main slide valves, initially flows through two separate communications to the passage 122 which is in open communication with the passage 125. The first of these communications includes the passage 287 and connections therefrom to the passage 122 hereinbefore mentioned, and the second including the passage 129 from which fluid vented thereto from the brake pipe flows to the passage 122 by way of the check valve 139, valve chamber 124 in the quick service limiting valve device 12, past the unseated limiting valve 126, passage 123, limiting valve diaphragm chamber 120, and restricted passage 121. When the pressure of fluid in the passage 122 and consequently in the diaphragm chamber 120 has been increased to about nine pounds, the diaphragm 116 flexes inwardly permitting the spring 127, acting through the medium of the plunger 128 to seat the valve 126. With the valve 126 seated the quick service flow of fluid from the brake pipe by way of the passage 129 is closed off. From this it will be seen that the final quick service flow of fluid from the brake pipe will be at a certain slow rate until the limiting valve 126 closes and will then continue at a slower rate, the faster rate of quick service flow until the limiting valve closes accelerating the propagation of quick service action throughout the train.

As the main slide valve is being moved to service position, it disestablishes communication between the release port 270 and the release passage 271, which is open to the atmosphere by way of the change-over valve device 11, and also laps the release passage 288.

It will here be noted that the final local quick service reduction in brake pipe pressure begins before the equalizing valve parts are in service position and, therefore, contributes to the prompt movement of the parts to service position and is also for the purpose of insuring the equalizing piston and associated slide valves remaining in service position until the auxiliary reservoir pressure has been reduced by the flow of fluid to the equalizing reservoir 8 and relay piston chamber 186 slightly below brake pipe pressure. This final quick service flow of fluid is at a slow rate, so as to smooth out or dampen surges which may have been created in the fluid under pressure in the brake pipe upon the effecting of the initial quick service reduction in brake pipe pressure.

With the several parts of the equalizing valve device in service position, fluid under pressure flows from the equalizing valve chamber to the take-up cylinder 5 and to the valve chamber 164 of the cut-in valve device 10 through the service port 274, passage 125 and the remainder of the communication hereinbefore traced.

Fluid under pressure supplied to the take-up cylinder causes the piston and stem thereof to move outwardly and actuate the brake rigging to take up the slack therein and to bring the usual brake shoes (not shown) into contact with the car wheels or nearly so. The brake rigging as it is moved by the take-up cylinder draws the push rod of the brake cylinder forwardly relative to the brake cylinder piston, said push rod being automatically locked in its outermost position with relation to the piston when the brake cylinder piston is moved outwardly by fluid under pressure supplied by the relay valve device 7, as will hereinafter appear. When the pressure in the take-up cylinder has been increased sufficiently (to around thirty pounds) to cause it to function in this manner, the pressure of fluid in the slide valve chamber 164 of the cut-in valve device 10 acting on that portion of the rear face of the piston 161 which is encircled by the seat rib 173, causes the piston and thereby the slide valve 163 to move outwardly against the resistance offered by the spring 171. The piston is provided with an annular rib 291 which, when the piston is moved to its extreme outer position, seals against a gasket 292, so as to prevent leakage of fluid past the periphery of the piston from the valve chamber 164 to the atmosphere. It will be noted that as soon as the seal between the piston gasket and the seat rib 173 is broken, the entire area of the inner face of the piston 161 is subjected to the pressure of fluid in chamber 164, so that the piston will move with a snap action to its extreme outer position.

The cut-in slide valve 163 as it is moved toward its cut-in position laps the passage 166, thereby cutting off communication from the auxiliary reservoir to the take-up cylinder, and laps the passage 165, thereby cutting off the communication from the valve chamber 164 to the take-up cylinder. The slide valve in its movement also laps the passage 177 and thereby cuts off communication from the valve chamber to the passage 177. After the passages 165, 166 and 177 are lapped, the cavity 167 in the slide valve 163, which remains in communication with the passage 168, is brought into open relation with the passage 228 and maintains the connection between these passages when the slide valve is in its extreme outer position. Further, as the slide valve moves to its extreme outer position and just before it reaches this position, it uncovers one end of a passage 293 to the valve chamber 164. The other end of this passage 293 has been previously uncovered to the valve chamber 32 of the equalizing valve device upon movement of the equalizing main slide valve 30 to service position, so that fluid under pressure flows from the equalizing valve chamber and connected auxiliary reservoir to the cut-in valve chamber 164 and acts to maintain the cut-in piston 161 and slide valve 163 in their extreme outer position.

With the cut-in slide valve in its extreme outer position, fluid under pressure flows from the equalizing slide valve chamber 32 and connected auxiliary reservoir to the volume reservoir 8 and to the piston chamber 186 of the relay valve device 7 by way of the service port 274 in the equalizing main slide valve 30, passages 125 and 168, cavity 167 in the cut-in slide valve 163, passages 228, 227 and 226, cavity 266 in the change-over rotary valve 148, passage 189 and pipe 188.

Fluid under pressure thus supplied to the relay piston chamber 186 causes the relay piston 187 and consequently the piston stem 190 and lever 191 to move inwardly from the position in which they are shown in Fig. 3. As the piston assembly is thus moved, the lever 191 thereof functions to actuate the exhaust valve mechanism 193 to close the exhaust communication from the chamber 196 and connected brake cylinder 6 to the passage 213 leading to the atmosphere. After the exhaust communication is closed, the lever functions to actuate the supply valve mechanism 192 to permit fluid under pressure to flow from the supply reservoir 4 by way of passage and pipe 200 to the chamber 196. Fluid supplied to the chamber 196 flows therefrom through passage and pipe 197 to the brake cylinder 6 which acts to apply the brakes. The relay valve device 7 is responsive to slight fluid pressure differentials and since the piston thereof is subject to the opposing pressures of the chambers 186 and 196, the rate of flow of fluid from the supply reservoir to the brake cylinder will be substantially the same as the rate of flow of fluid from the auxiliary reservoir to the chamber 186.

Fluid under pressure supplied through the service port 274 of the equalizing main slide valve to the passage 125 flows from said passage to the piston chamber 232 of the inshot valve mechanism 17 by way of a passage 294 in the emergency valve device 25, a cavity 295 in the emergency main slide valve 59, passage 235, volume chamber 234 and passage 233.

Fluid under pressure supplied to the passages 227 and 226, besides flowing to the volume reservoir passage 189 by way of the change-over valve device 11, also flows to this latter passage by way of the choked portion of the passage 226, valve chamber 225 of the inshot valve device, past the unseated valve 224, passage 237, chamber 238 and passage 239.

From the volume reservoir and relay piston chamber supply passage 188, fluid under pressure flows to the safety valve device by way of passage 239, chamber 238 in the inshot valve device 17, passage 241, cavity 247 in the emergency main slide valve 59 and passage 248. It will here be noted that since the flow of fluid under pressure to the chambers 232 and 238 of the inshot valve mechanism is from the auxiliary reservoir 2, the pressure of fluid in these chambers will increase together when a service application of the brakes is being effected, so that the spring 231 acts through the medium of the inshot piston 229 and its stem 230 to maintain the valve 224 unseated, thus the inshot valve mechanism is rendered ineffective to vary the rate of flow of fluid under pressure to the volume reservoir and relay piston chamber.

In passenger train service, the equipment is usually charged to a high pressure, say to about one hundred ten pounds, so that in case of an over-reduction in brake pipe pressure in effecting a service application of the brakes, the pressure of fluid in the volume reservoir and relay piston chamber tends to rise above sixty-three pounds. When such a rise occurs, the safety valve operates to vent fluid under pressure from said reservoir and chamber to the atmosphere, so that the maximum pressure of the volume reservoir and relay piston chamber and consequently of the brake cylinder is limited to sixty three pounds.

*Operation of the emergency valve device in effecting a service application of the brakes with the equipment conditioned for passenger train operations*

Upon a service reduction in pressure in the emergency piston chamber 56, the emergency piston 57 and associated auxiliary slide valve 60 are shifted outwardly, i. e., in the direction toward the right hand, relative to the main slide valve 59, by fluid in the emergency valve chamber 61 at quick action chamber pressure. As the piston is thus shifted it closes the communication between the emergency piston chamber 56 and the passage 62 leading to the quick action chamber 63 and emergency valve chamber 61, and at substantially the same time, a port 296 in the auxiliary slide valve 60 is brought into registration with a port 297 in the main slide valve 59, which port 297 is connected with a passage 298 open to the atmosphere. Fluid under pressure now flows through the registering ports and passage from the valve chamber 61 and connected quick action chamber 63 at a rate substantially equal to the service rate of reduction in the pressure of fluid in the emergency piston chamber 56, so that the operating pressure differential on the emergency piston 57 is substantially destroyed. In the service position of the emergency piston, the plunger 71, carried by the piston stem 58, is adapted to just engage the rear end surface 70 of the main slide valve 59, so that unintentional further movement of the piston and auxiliary slide valve 60 toward the right hand is prevented by the action of the spring 72.

*Limited service application of the brakes with the equipment conditioned for passenger train operations*

In order to limit the degree of brake application, the brake pipe pressure is only reduced an amount sufficient to effect the desired service application. Then when the auxiliary reservoir pressure in the equalizing valve chamber 32 is reduced by the flow of fluid therefrom by way of the service port 274 and connected passages to the volume reservoir 8 and relay piston chamber 186, an amount substantially equal to the degree of brake pipe reduction in equalizing piston chamber 27, the equalizing piston 28 and auxiliary slide valve 31 are moved rearwardly from service position to service lap position, in which the piston is brought to a stop by reason of its engagement with the forward end of the main slide valve 30. This movement of the equalizing piston and associated auxiliary slide valve is facilitated by the action of the compressed spring 46, which cooperates with the piston stem and with the main slide valve through the medium of the plunger 44 to force the piston away from the gasket 26, that is to say, to move the piston so that the seal between the piston and the gasket is broken. After the piston seal is thus broken, the spring 46 acts through the medium of the plunger 44 to continue the movement of the equalizing piston 28 and slide valve 31 toward service lap position, but just before the service port 274 is fully lapped by the valve, the end of the plunger 44 engages the piston stem, so that the spring will no longer act to move the piston and slide valve toward lap position. Now, a slight fluid pressure differential on the piston, which will be caused by the pressure of fluid in valve chamber 32 reducing slightly below the brake pipe pressure in piston chamber 27, moves said piston and thereby the auxiliary slide valve to lap position, in which the valve laps the service port 274 and thus closes off the flow of fluid from the piston chamber to the volume reservoir 8 and relay piston chamber 186.

When the pressure of fluid in the chamber 196 of the relay valve device becomes slightly greater than the pressure existing in chamber 186 and the connected volume reservoir 8, the relay piston assembly, which includes the piston 187, piston stem 190 and lever 191, will be moved outwardly, the lever operating to permit the supply valve mechanism to close off the flow of fluid from the supply reservoir 4 to the chamber 196 and consequently to the brake cylinder. The piston assembly will come to a stop when the flow of fluid from the supply reservoir to the chamber 196 is terminated. When the piston is thus maintained stationary, the lever maintains the exhaust valve mechanism 193 in its brake cylinder exhaust closing position.

With the auxiliary slide valve in lap position, the cavity 269 connects the release ports 268 and 270, but since the communication between these ports and the release passages 228 and 271 is cut off, fluid under pressure will not be released from the equipment.

When the degree of brake pipe reduction is thus limited, the quick action chamber pressure in the emergency valve chamber 61 continues to reduce by the flow of fluid through the registering ports 296 and 297 and passage 298 until the pressure of fluid in said chamber is slightly below the brake pipe pressure in piston chamber 56, at which time the fluid pressure differential created on the emergency piston causes the piston and auxiliary slide valve 31 to return to release position, in which position, the ports 296 and 297 are out of registration with each other, so that further reduction in the pressure of fluid in the emergency valve chamber does not occur.

*Reapplication of the brakes from service lap position to service position with the equipment conditioned for passenger train operations*

If, after a limited application of the brakes has been effected, it is desired to increase the brake cylinder pressure, a further reduction in brake pipe pressure is effected through the medium of the brake valve device, which causes the equalizing piston 28 to move from service lap position toward service position, shifting the auxiliary slide valve to uncover the service port 274, so that fluid under pressure again flows from the auxiliary reservoir to the volume reservoir 8 and relay piston chamber 186, causing the relay valve device to again function to supply fluid under pressure from the supply reservoir 4 to the brake cylinder 6. After the service port 274 is uncovered, continued movement of the piston causes the auxiliary slide valve 31 to be shifted to service position against the resistance offered by the spring 46. As the auxiliary slide valve is thus moved after the service port 274 is opened, the cavity 284 in said valve establishes the quick service communication between the quick service ports 285 and 286 in the main slide valve 30. With these ports connected, the local quick service flow of fluid from the brake pipe to the volume reservoir 8 and relay piston chamber 186 takes place by way of passage 228 and communication therefrom to pipe 188 connected to said reservoir and chamber. With the volume reservoir and relay piston chamber pressure in excess of ten pounds, the quick service modifying valve 126 will be closed, so that no quick service flow of fluid will take place by way of the passage 129.

*Full release of the brakes after a service application with the equipment conditioned for passenger train operations*

To effect a release of the brakes after an application, fluid under pressure is supplied to the brake pipe 1 and flows therefrom to the equalizing piston chamber 27 and emergency piston chamber 56 in the same manner as has hereinbefore been described in connection with the initial charging of the equipment.

To initiate the release of the brakes, it is customary to first move the brake valve to release position, in which fluid under pressure is supplied directly from the main reservoir (not shown) to the brake pipe, and then, after a predetermined interval of time has elapsed, the brake valve is moved to running position, in which fluid at feed valve pressure is supplied to the brake pipe.

The initial supply of fluid at high pressure to the brake pipe rapidly increases the brake pipe pressure, the high head of pressure at the front end of the train being adapted to cause a rapid flow of fluid under pressure to the rear of the train, so as to accelerate the release of the brakes and the recharging of the brake equipment on the cars at the rear end of the train.

The rapid increase in brake pipe pressure creates a pressure differential on the equalizing valve piston 28 which causes the piston and thereby the slide valves 30 and 31 to promptly move to their normal or outer release position, in which the collar 39 on the equalizing piston stem 29 engages the movable stop 36. The piston and slide valves also have an inner release position, but regardless of whether the piston and slide valves are in the outer release position or the inner release position, the feed groove 259 and feed passage 256 are open, so that fluid under pressure is permitted to flow at a restricted rate from the piston chamber 27 through both the feed groove and feed passage to the equalizing valve chamber 32 and auxiliary reservoir 2. When, as may be the case on the cars at the head end of a train, the rate of flow to the piston chamber 27 is faster than the rate of flow of fluid through the passages, a sufficient pressure differential is created on the piston to cause the piston and slide valves 30 and 31 to move to the inner release position.

In either the outer or inner release position of the several parts of the equalizing valve device, fluid under pressure is supplied at a restricted rate from the fully charged emergency reservoir 3 by way of pipe and passage 147, rotary valve chamber 146 of the change-over valve device 11, port 265 in the change-over rotary valve, passage 264, passage in the choke plug 263, chamber 262, passage 261, and the port 260 in the equalizing main slide valve 30, which port 260 has been uncovered by the auxiliary slide valve. Due to the restricting of the flow of fluid from the brake ipe to the auxiliary reservoir and equalizing valve chamber 32 and to the supplying of fluid from the fully charged emergency reservoir to the auxiliary reservoir, the amount of fluid taken from the brake pipe will not be great, so that more fluid will flow toward the rear of the train, thus hastening the recharge of the brake pipe on cars at the rear end of the train.

The choke plug 263 limits the rate at which fluid flows from the emergency reservoir to such an extent that, after the brake valve is moved from release position to running position, and the brake pipe pressure on the cars drops to or below that supplied by the feed valve device at the locomotive, the auxiliary reservoir pressure in valve chamber 32 will be less than the brake pipe pressure in piston chamber 27. By reason of this, unintentional movement of the equalizing valve parts from a release position to quick service or service position in releasing the brakes is prevented.

With the equalizing valve parts in either the outer or inner release position, the cavity 267 in the main slide valve 30 is connected to the passage 228, so that fluid under pressure is released from the volume reservoir and piston chamber 186 of the relay valve device 7 by way of pipe 188, passage 199, cavity 266 in the change-over rotary valve, passages 226, 227, and 228, cavity 267 and port 268 in the main slide valve 30, cavity 269 in the auxiliary slide valve 31, port 270 in the main slide valve, passage 271, cavity 272 in the change-over rotary valve, passage and pipe 273, and retaining valve device 19. Fluid under pressure is initially vented from the valve chamber 164 of the cut-in valve device 10 by way of passage 293 and cavity 267 in the main equalizing slide valve 30.

Fluid under pressure is vented from the chamber 238 of the inshot valve mechanism 17 by way of passages 239 and 189 and also by way of passages 226, 227 and 228. Since the pressure side of the safety valve device 14 is connected through the cavity 247 in the emergency main slide valve to the chamber 238, fluid under pressure is vented therefrom by way of the chamber and passage 239.

Upon the venting of fluid under pressure from the volume reservoir 8 and piston chamber 186 of the relay valve device 7, fluid at brake cylinder pressure moves the relay piston 187 and thereby the piston stem 190 and lever 191 outwardly to its brake cylinder release position. As the piston moves outwardly the lever 191 operates to permit the supply valve mechanism 192 to close the supply communication from the supply reservoir 4 to the chamber 196 and then operates to shift the exhaust valve mechanism to open the exhaust communication from the chamber 196 to the atmosphere. With the exhaust communication thus established, fluid under pressure is vented from the brake cylinder 6 by way of pipe and passage 197, chamber 196, past the unseated exhaust valve 208 and passage 213, thus the brakes are released.

The supply reservoir 4 is recharged with fluid under pressure from the brake pipe 1 by way of pipe and passage 216, strainer chamber 215 of the relay valve device, strainer 217, passage 218, past the ball check valves 219 and 220, passage 204, passage in the choke plug 222 and passage and pipe 200. The choke plug 222 is provided for the purpose of so restricting the rate of flow of fluid to the supply reservoir that the flow will not materially interfere with the rate of increase in brake pipe pressure. The check valves 219 and 220 are provided for the purpose of preventing black flow of fluid from the supply reservoir 4 to the brake pipe when the brake pipe pressure is for any reason reduced.

When the pressure of fluid in the valve chamber 164 of the cut-in valve device 10 has been reduced by the flow of fluid through the passage 293 to the atmosphere slightly below the pressure of the spring 171, said spring acts to shift the piston 161 and thereby the slide valve 163 to their innermost or release position, in which fluid under pressure is vented from the take-up cylinder device 5 by way of pipe and passage 165, valve chamber 164, port 176 in the slide valve 163, passage 177 and cavity 267, the passage 293 being lapped by the slide valve 163 when said valve is in release position.

With the slide valve 163 in release position, fluid under pressure is vented from the piston chamber 232 of the inshot valve mechanism 17 by way of passage 233, chamber 234, passage 235, cavity 295 in the emergency main slide valve 59, passages 294, 125 and 168, cavity 167 in the slide valve 163, passages 166 and 165, valve chamber 164, port 176 in the slide valve 163, passage 177 and cavity 267 in the equalizing main slide valve 30.

When, in releasing the brakes, the brake pipe pressure in the chamber 105 at one side of the flexible diaphragm 104 of the release insuring valve device 15 exceeds the auxiliary reservoir pressure in the diaphragm chamber 106 by a predetermined amount, as fixed by the value of the spring 110, say about one and one-half pounds, said diaphragm will flex in the direction of the lower pressure and cause the release insuring valve 108 to be unseated. The equalizing valve piston and slide valves 30 and 31 are intended to move from their service position to release position when the brake pipe pressure in the piston chamber 27 exceeds auxiliary reservoir pressure in the valve chamber 32 by about one and one-quarter pounds, so that the main slide valve 30 will lap the passage 109 before the release insuring valve 108 is unseated, said passage 109 being connected in the service position of the main slide valve to the cavity 267.

If, however, a greater pressure differential is required to move the equalizing piston and associated slide valves to release position than is required to unseat the valve 108, the valve will be opened before the equalizing piston moves from service to release position, and since in the service position of the main slide valve, the cavity 267 is connected to the passage 271 which is connected to the atmosphere, fluid under pressure will now flow from the equalizing valve chamber 32 to the atmosphere.

On the cars toward the rear end of the train where the rate of increase in brake pipe pressure will be slow, the equalizing valve parts have a tendency to be delayed in their movement from service toward release position, and in some cases, may have a tendency to remain in service position. However, these objectionable tendencies will be eliminated, for where the rise in brake pipe pressure above the auxiliary reservoir pressure exceeds the desired amount, fluid under pressure will be vented from the auxiliary reservoir to the atmosphere, with the valve 108 unseated, until a sufficient fluid pressure differential is created on the equalizing piston 28 to cause it to shift the main slide valve 30 toward release position and into lapping relation with the passage 109, in which relation the slide valve cuts off the flow of fluid from the auxiliary reservoir.

*Graduated release of the brakes with the equipment conditioned for passenger train operations*

In passenger train operations it is very desirable to reduce the brake cylinder pressure in steps, in other words to graduate the release of the brakes.

Assuming the several parts of the equipment to be in service position, as hereinbefore described, and it is desired to graduate the release of the brakes, the brake valve is first moved to release position to quickly increase the brake pipe pressure sufficiently to cause the parts of the equipment to move to release position, and is then moved to lap position, in which the flow of fluid from the main reservoir to the brake pipe is closed off.

With the parts of the equalizing valve device in release position, fluid under pressure is vented from the volume reservoir 8 and relay piston chamber 186 of the relay valve device in the same manner as has already been described in connection with the full or complete release of the brakes. This causes the relay valve device to operate to initiate a reduction in brake cylinder pressure. With the brake valve in lap position, it is obvious that there will be no further increase in brake pipe pressure and as a result of this the pressure of fluid in the equalizing valve chamber 32 will be increased by the flow of fluid from the fully charged emergency reservoir 3. When the pressure in valve chamber 32 slightly exceeds the brake pipe pressure in the equalizing piston chamber 27, fluid under pressure in said chamber 32 causes the piston and thereby the auxiliary slide valve 31 to move outwardly relative to the main slide valve. The piston 28 and slide valve 31 move but a very short distance when the slide valve laps the port 260 and thereby closes off the flow of fluid to the valve chamber 32, and since with the port 260 closed, no further increase in the pressure of fluid in the chamber will be effected, the equalizing piston and auxiliary slide valve will come to a stop. At substantially the same time as the port 260 is lapped, the auxiliary slide valve also laps the port 268 in the main slide valve 30 and thus closes off the exhaust flow of fluid from the volume reservoir 8 and piston chamber 186 of the relay valve device 7. Now when the brake cylinder pressure has been reduced slightly below the reduced relay piston chamber pressure, the relay valve device is caused to operate to close the brake cylinder exhaust communication to the atmosphere. Since with the brake cylinder exhaust communication closed, no further reduction in brake cylinder pressure occurs, the several movable parts of the relay valve device come to a stop.

When it is desired to make another step reduction in brake cylinder pressure, the brake valve may be moved from lap to running position and when the desired reduction in brake cylinder pressure is attained, the brake valve is returned to lap position. The increase in brake pipe pressure effected upon movement of the brake valve to running position causes the piston 28 and thereby auxiliary slide valve 31 to be shifted to release position, in which the ports 260 and 268 are again opened to the auxiliary reservoir and the port 270, respectively, the opening of the port 260 permitting the flow of fluid from the emergency reservoir to the auxiliary reservoir and the opening of the port 268, permitting fluid under pressure to flow from the volume reservoir 8 and relay piston chamber 186 to the atmosphere, the resulting reduction in the relay piston chamber causing the relay valve device to operate to effect a corresponding reduction in brake cylinder pressure. With the brake valve in lap position, the equalizing piston and auxiliary slide valve will again move to close off the flow of fluid from the volume reservoir and relay piston chamber, so that the relay valve device will be caused to operate to close off the flow of fluid from the brake cylinder to the atmosphere.

It will be understood that by means of the brake valve, the equalizing valve device and relay valve device may be caused to operate to reduce the brake cylinder pressure in as many successive steps as desired, until such time as the emergency reservoir pressure equalizes into the auxiliary reservoir. After such equalization, any further increase in brake pipe pressure moves the equalizing piston and auxiliary slide valve to release position, where they remain until the brakes are completely released.

It will here be noted, that in effecting a graduated release of the brakes, the stabilizing spring 46, carried by the equalizing piston stem, does not engage the main slide valve 30 and, therefore, does not in any way control the operation of the piston or slide valve. In view of this and of the fact that the only resistance offered to the movement of the piston is the frictional resistance of the piston and slide valve, the piston will be very sensitive to variations in the pressures of fluid in the chambers 27 and 32.

*Emergency application of the brakes with the equipment conditioned for passenger train operation*

To effect an emergency application of the brakes, fluid under pressure is vented from the brake pipe 1 and from the connected equalizing valve piston chamber 27 and emergency valve piston chamber 56, and upon said reduction, the equalizing valve device 24 operates in the same manner as in effecting a service application of the brakes to supply fluid under pressure from the auxiliary reservoir to the passage 125.

At substantially the same time as the equalizing valve device operates upon an emergency reduction in brake pipe pressure, fluid under pressure in the emergency valve chamber 61, acting on the inner face of the emergency piston 57 causes the piston to move outwardly. The piston as it moves, first shifts the auxiliary slide valve 60 relative to the main slide valve 59 and then shifts both slide valves in unison to emergency position, in which position, the piston engages the gasket 55. As the piston is thus being moved, it closes the communication through the choke plug 64 from the emergency piston chamber 56 to the passage 62, after which the auxiliary slide valve 60 uncovers a port 302 in the main slide valve 59, which port, at the seat of the main slide valve, is in open communication with the passage 134, so that fluid under pressure now flows through said port and passage from the emergency valve chamber 61 and connected quick action chamber 63 to the quick action piston chamber 133.

After the port 302 has been uncovered, the collar 69 on the emergency piston stem 58 engages the rear end surface 70 of the main slide valve 59, so that the emergency piston, as it continues to move, shifts the main slide valve to emergency position. At the time the collar 69 engages the main slide valve, the spring 72 will have been compressed, the compression of the spring being started just prior to the auxiliary slide valve 60 opening the port 302.

The main slide valve 59 in its movement toward emergency position first closes communication from the port 300 to the passage 84 leading to the piston chamber 83 of the stop device 81 and then brings the cavity 295 into open communication with said passage and also with a passage 303 which is in constant open communication with the passage 147 leading from the emergency reservoir, so that fluid under pressure now flows from the emergency reservoir to the piston chamber 83. With the passage 303 in communication with the cavity 295 and the cavity remaining in communication with the passage 294, fluid under pressure is supplied from the emergency reservoir by way of said passage 294 to passage 125, which is also being supplied with fluid under pressure from the auxiliary reservoir. Fluid under pressure thus supplied to the passage 125 flows therefrom to the take-up cylinder device 5, relay piston chamber 186 and volume reservoir 8, in the same manner as has been hereinbefore described in connection with a service application of the brakes, causing the relay valve device to operate to supply fluid under pressure from the supply reservoir to the brake cylinder.

As the main slide valve 59 is being moved toward emergency position, it laps the safety valve passage 248 and thereby cuts off the communication from said passage to the passage 241, which is connected through chamber 238 of the inshot valve mechanism 17 and passage 239 to the passage 189, through which fluid is being supplied from both the auxiliary reservoir and emergency reservoir to the volume reservoir 8 and relay piston chamber 186, so that the safety valve device is rendered ineffective to limit the degree of brake application.

Further, as the main slide valve 59 is moved toward emergency position, the end of the valve moves beyond the passage 134, so that fluid flows directly from the valve chamber 61 to the passage. It will be understood that since the movement of the main slide valve will be very rapid, there will be no material interruption in the flow of fluid from the valve chamber 61 to the quick action piston chamber during the time the port 302 is moved out of communication with the passage 148 and the uncovering of the passage 148.

Fluid under pressure thus supplied to the quick action piston chamber 133 causes the quick action piston 132 to move inwardly and unseat the quick action vent valve 139 against the opposing pressure of the spring 142, thereby connecting the brake pipe passage 99 by way of passages 144 and 137 to the atmosphere. With this communication established, fluid under pressure is suddenly vented from the brake pipe for the purpose of serially transmitting emergency action through the train.

Fluid under pressure is gradually vented from the emergency slide valve chamber 61 and connected quick action chamber 63 by way of the choked passage 145 in the quick action piston 132. When the quick action chamber pressure has been reduced, by the flow of fluid through the passage 145, to a predetermined degree, the spring 142 acts to close the quick action valve 139 and also acts, through the medium of the valve and stem 138, to return the piston 132 to its normal position. The rate at which quick action chamber pressure reduces through the passage 145 is slow enough to insure the quick action valve 139 remaining open until substantially the complete venting of fluid under pressure from the brake pipe has been accomplished.

As the pressure of fluid in the emergency valve chamber 61 is being reduced, fluid at emergency reservoir pressure in piston chamber 83 of the stop device 81, causes the piston 82, springs 86, follower plate 87 and plunger 88 to move forwardly, i. e., in a direction toward the end of the emergency piston stem 58, as a unit, until brought to a stop by the piston engaging a sealing gasket 304 clamped between the casing of the device and the cap 65 of the emergency valve device.

Upon the substantially complete venting of fluid from the emergency valve chamber 61, the pressure of the compressed spring 72, acting through the medium of the piston stem 58, causes the emergency piston 57, and thereby the auxiliary slide valve 60, to move rearwardly relative to the main slide valve 59, but upon the engagement of the end of the plunger with the piston stem, the spring 72 will no longer act to retract the emergency piston, and due to this, the rearward movement of the piston and slide valve ceases before the piston engages the front end of the main slide valve 59 and before the rear end of the plunger stem 75, carried by the piston stem, can engage the plunger 88 of the stop device 81. This movement of the piston breaks the seal between the gasket 55 and the piston, so that when the brake pipe pressure is increased to effect the release of the brakes, the fluid under pressure supplied from the brake pipe to the emergency piston chamber 56 will act over the entire area of the face of the piston instead of over only a portion of the area, as would be the case if such movement did not occur.

It will be noted that since the safety valve device 14 is rendered inoperative, the emergency and auxiliary reservoir pressures may equalize at a rapid rate into the volume reservoir and relay piston chamber 186 and that due to this, the relay valve device will function to provide a corresponding high pressure in the brake cylinder.

It will also be noted that when the main slide valve 59 moves to emergency position, the passage 235 is lapped, so that the piston chamber 232 of the inshot valve mechanism is at atmospheric pressure. By reason of this, the pressure of fluid in chamber 238 causes the inshot piston 229 to move in a direction toward the left hand, permitting the spring 236 to close the passage 237, but since the flow of fluid from the auxiliary reservoir and emergency reservoir is through communications other than the choked portion of the passage 226 and valve chamber 225, the operation of the inshot valve mechanism will not materially vary the rate of flow of fluid to the volume reservoir 8 and relay piston chamber 186.

*Release of the brakes after an emergency application with the equipment conditioned for passenger train operations*

To effect a release of the brakes after an emergency application, fluid under pressure is supplied to the brake pipe 1 in the usual manner, and flows to the equalizing piston chamber 28 and to the emergency piston chamber 56.

Fluid in the equalizing valve chamber 32 is at reduced auxiliary reservoir pressure and fluid in the emergency valve chamber 61 is at atmospheric pressure, so that upon a slight increase in brake pipe pressure, the emergency piston will start to move rearwardly toward release position before the equalizing valve device is caused to move toward release position. As will hereinafter more fully appear, the equalizing valve device will not, as a matter of fact, begin to move toward release position until after the emergency valve device is in a release position.

As the emergency piston 57 thus moves, the rear end of the plunger stem 75, carried by the emergency piston stem 58, is brought into engagement with the forward end of the plunger 88 of the stop device 81. At substantially the same time as the plunger stems engage with each other, the piston operatively engages the forward end of the emergency main slide valve 59.

Since the piston 82 of the stop device 18 is maintained in its forward position by fluid from the emergency reservoir, further rearward movement of the emergency piston 57 and thereby the rearward movement of the main and auxiliary slide valves 59 and 60, respectively, will now be yieldably resisted by the springs 86 acting through the medium of the follower plate 87, collar 89 and plunger 88.

Now, when the brake pipe pressure has been increased to a predetermined degree, say for instance to twenty pounds, the emergency piston and slide valves will have been moved to a position in which the port 300 is cracked open to the passage 34 just prior to the piston 57 uncovering the port in which the choke plug 64 is interposed, so that fluid under pressure is quickly vented from the piston chamber 83 of the stop device 81 to the emergency valve chamber 61 and quick action chamber 63 which are at atmospheric pressure. Upon thus venting fluid from the piston chamber 83, the device 81 no longer acts to oppose the rearward movement of the emergency piston and slide valves, and with the resistance of the device 81 thus eliminated, fluid at brake pipe pressure (around twenty pounds) in the emergency piston chamber 56, causes the piston and slide valves to quickly move past their normal release position to an inner release or back-dump position against the opposing pressure of the spring 67 acting through the medium of the member 66. The emergency piston, as it thus moves, shifts the several parts of the device 81 to their normal position, in which position they are shown in Fig. 1. From the above it will be noted, that there is approximately a twenty pound pressure in the emergency piston chamber 56 before the resistance of the stop member 81 is relieved, which pressure is sufficient to insure the movement of the emergency valve parts to their back-dump position in effecting the release of the brakes after an emergency application. Also this pressure is well above any pressure to which the brake pipe may be increased when, in effecting an emergency application of the brakes on a train having some cars equipped with the present equipment and other cars equipped with the "K" equipment, there is a flow of fluid from the "K" equipped cars to the cars equipped with the present equipment, thus insuring against the accidental movement of the emergency valve device to back-dump position.

With the emergency valve device in back-dump position, the connection from the emergency piston chamber to the quick action chamber 63 and piston chamber 61 by way of the choke plug 64 is uncovered by the emergency piston.

With the various parts of the emergency valve device 25 in the inner release or back-dump position, the cavity 295 in the emergency main slide valve 59 connects the passage 294 to a passage 305 which is in communication past check valves 306 and 307 with the brake pipe passage 99 leading from the strainer chamber 95 in the pipe bracket and consequently from the brake pipe 1. With this communication established, fluid under pressure flows from the auxiliary reservoir volume reservoir 8 and relay piston chamber 186 to the brake pipe. The cut-in valve device 10 still being in its outermost position, the flow of fluid from the volume reservoir 8 and relay piston chamber 186 to the brake pipe is by way of pipe 188, passage 189, cavity 266 in the change-over rotary valve, passages 226, 227 and 228, cavity 167 in the cut-in slide valve 163, passages 168, 125 and 294, cavity 295 in the emergency main slide valve 59, passage 305, past the check valves 306 and 307, passage 99, chamber 95, and connections from said chamber 95. The equalizing valve device 24, still being in application position, the flow of fluid from the auxiliary reservoir is by way of pipe and passage 33, equalizing slide valve chamber 32, service port 274 in the equalizing main slide valve 30, passage 125 and connections just traced which lead from said passage 125 to the brake pipe. This back-dump action effects several desirable results; first, it serves to save fluid under pressure which would otherwise be lost; second, it rapidly increases the brake pipe pressure, which increase acts to hasten the recharging of the equipment on a train after an emergency application of the brakes; and further, by reducing auxiliary reservoir pressure to a low degree, substantially to equalization with the brake pipe, it facilitates movement of the equalizing valve parts to effect a release of the brakes.

When the brake pipe pressure has been increased about one and one-quarter pounds above the reduced auxiliary reservoir pressure in the equalizing valve chamber 32, the equalizing valve device will be caused to move to release position and the relay valve device 7 will be caused to operate to release the remaining fluid under pressure from the brake cylinder and the cut-in valve device will be caused to operate to vent fluid under pressure from the take-up cylinder device 5, all in substantially the same manner as has hereinbefore been described in connection with the release of the brakes after a service application of the brakes.

When, in releasing the brakes after an emergency application, the equalizing valve device does not function upon an increase in brake pipe pressure of one and one-quarter pounds over the reduced auxiliary reservoir pressure, the release insuring valve device 15 will function to reduce auxiliary reservoir pressure in the same manner as in effecting the release of the brakes after a service application.

When the pressure of fluid in the emergency valve chamber has been increased by flow of fluid from the emergency piston chamber 55 to substantially the pressure of fluid in the chamber 56, the member 66, under the influence of the spring 67, shifts the main slide valve 59 and thereby the piston 57 and auxiliary slide valve 60 to their outer or normal release position.

With the equalizing valve parts in release position, fluid under pressure is adapted to flow from the equalizing valve chamber to the emergency reservoir by way of port 260 in the equalizing main slide valve 30, passage 261, chamber 262, choke plug 263, passage 264, port 265 in the change-over rotary valve 148, rotary valve chamber 146 and passage and pipe 147.

*Method of changing the position of the change-over valve from any one of its equipment conditioning positions to another*

It will be noted from an inspection of Figs. 9, 10, and 11 of the drawings that with the equipment charged with fluid at a pressure sufficient to cause the flexible diaphragm 157 to maintain the locking bar 155 in locking position against the opposing pressure of the spring 158, the valve device 11 will be maintained locked, and to cause the locking bar to be moved to its unlocking position, fluid under pressure in diaphragm chamber 159 must be reduced below the pressure of the spring. To effect such a reduction, the reservoir release valve device 13 is operated to vent fluid under pressure from the system to the atmosphere. In the present embodiment of the invention the spring 158 will cause the locking bar to move out of its locking position when the pressure of fluid in the system is reduced to around twenty pounds. When the locking bar has been moved out of locking position, the operator, by the use of the handle 150, may turn the change-over rotary valve to the desired conditioning position, the handle being provided with movable plunger 350, which is urged by a spring (not shown) into engagement with a stationary quadrant 351 within suitable positioning notches, to indicate when the change-over valve is in the desired position.

*Operation of the equipment with the change-over valve device in position to condition the equipment for express train operations*

With the change-over valve device 11 in position to condition the equipment for express or short freight train operations, the rotary valve 148 thereof laps the auxiliary reservoir charging passage 256, the continuous quick service passage 289, the passage 264, through which fluid flows from the emergency reservoir toward the auxiliary reservoir when the equipment is conditioned for passenger train operation, the graduated release passage 271, the passage 340 through which fluid under pressure is supplied to the water raising system when the equipment is conditioned for passenger train operations, and the passage 122.

With the rotary valve 148 in this position, the cavity 266 maintains the passage 189 leading to the volume reservoir 8 and relay piston chamber 186 connected with the passage 226, to which fluid under pressure is adapted to be supplied in effecting an application of the brakes. Further, with the rotary valve in this position, a cavity 353 therein connects a direct release passage 354, leading from the seat for the equalizing main slide valve 30, to the exhaust passage 273 connected with the atmosphere by way of the retaining valve device, and a port 355 in the rotary valve, leading from the rotary valve chamber 146 and consequently from the emergency reservoir, registers with a passage 356 leading to the small chamber 262 and consequently to the seat for the equalizing main slide valve 30, said passage 356 having a choke plug 357 interposed therein.

It will be noted that with the charging passage 256 lapped by the change-over rotary valve, the flow of fluid from the brake pipe to the auxiliary reservoir will be only by way of the feed groove 259, equalizing slide valve chamber 32 and passage and pipe 33. From the valve chamber 32, fluid under pressure flows to the emergency reservoir by way of port 260 in the equalizing main slide valve 30, passage 261, cavity 262, the passage in the choke plug 357, passage 356, port 355 in the change-over rotary valve, rotary valve chamber 146 and passage and pipe 147. In recharging the equipment after a service application of the brakes has been effected, fluid under pressure flows from the emergency reservoir to the auxiliary reservoir and the rate of such flow is controlled according to the flow area of the passage in the choke plug 357 instead of according to the flow area of the passage in the choke plug 263 as when the equipment is conditioned for passenger train operation. The flow area of the passage in the choke plug 263 is such as to permit a fairly rapid flow of fluid from the emergency reservoir to the equalizing slide valve chamber 32 when, with the equipment conditioned for passenger train operations, a graduated release of the brake is being effected, the rate of flow being sufficient to cause the prompt movement of the equalizing valve device to lap position when the brake valve is turned to lap position and also insures a fairly rapid charge of the emergency reservoir. The flow area of the passage in the choke plug 357 is less than that of the passage in the choke plug 263, so that the rate of flow of fluid from the emergency reservoir to the valve chamber 32 and auxiliary reservoir, as well as the flow of fluid from the chamber 32 to the emergency reservoir, will be slower than when the equipment is conditioned for passenger train operations. In view of this, together with the fact that the auxiliary reservoir and emergency reservoir are charged by way of the feed groove only, the charging of the equipment will be at a slower rate than when the equipment is conditioned for passenger train operations. By thus retarding the rate of flow of fluid from the brake pipe to the auxiliary reservoir and emergency reservoir, more air will flow toward the rear of the train and will consequently accelerate the release of the brakes after an application.

With the continuous quick service passage 289 lapped, the only local quick service flow of fluid from the brake pipe which can occur with the equalizing valve device in application position, is by way of the restricted passage 281, the tail cavity of the quick service port 277 in the equalizing main slide valve 30, passage 129, past the check valve 130 associated with the quick service limiting or modifying valve device 12, valve chamber 124, past the unseated quick service limiting valve 126, passage 123, diaphragm chamber 120, passage 121 and passage 122, which is connected to the volume reservoir 8, and relay piston chamber 186. Now, when the pressure of fluid in the connected volume reservoir 8 and relay piston chamber 186 and consequently in the diaphragm chamber 120, is increased to around nine pounds, the diaphragm 116 will be caused to flex downwardly, permitting the spring 127 to act to seat the quick service limiting valve, thus closing off the quick service flow of fluid from the brake pipe. This final local reduction in brake pipe pressure contributes to the prompt movement of the equalizing valve to service position and is for the purpose of insuring the equalizing piston 28 remaining in service position until the desired volume reservoir and relay piston chamber pressure and consequently brake cylinder pressure (about nine pounds) is developed.

With the passage 340 lapped, the water raising mechanism (not shown) is rendered ineffective.

With the graduating release passage 271 lapped and the direct release passage 354 connected by the cavity 353, in the change-over rotary valve, to the atmospheric release passage 273, the graduated release of fluid from the volume reservoir and relay piston chamber can no longer be accomplished. Thus, with the equipment conditioned for express train service, the graduated release feature is annulled.

In express train operations, the equalized pressures of the auxiliary reservoir volume reservoir 8 and relay piston chamber in effecting a full service application of the brakes, will be less than the setting of the safety valve device, so that this device will not function to reduce the pressure of the volume reservoir and connected relay piston chamber, as it does when the equipment is conditioned for passenger train operations.

Aside from the differences above noted, the equipment functions to control the brakes in substantially the same manner as when it is conditioned for passenger train operations.

*Operation of the equipment with the change-over valve device in position to condition the equipment for long freight train operations*

With the change-over valve device 11 in position to condition the equipment for long freight train operations, the rotary valve 148 thereof cuts off the communication between the passages 189 and 226, but aside from this, the valve maintains the same ports lapped or connected which are lapped or connected when the valve is in position to condition the equipment for express train operations.

Since the passage 226 is disconnected, at the seat of the change-over rotary valve 148, from the passage 189, fluid under pressure supplied from the auxiliary reservoir to the passage 125 by the equalizing valve device in effecting an application of the brakes, must flow to the volume reservoir 8 and relay piston chamber 186 by way of passage 168, cavity 167 in the slide valve of the cut-in valve device 10 with said device in its extreme outer position, passages 228 and 227, restricted portion of the passage 226, inshot valve chamber 225, past the inshot valve 224, passage 233 and passage in the choke plug 240, chamber 238, passages 239 and 189 and pipe 188. From the passage 125, fluid under pressure flows to the inshot piston chamber 232 in the same manner as has been heretofore described in connection with the equipment conditioned for passenger train operations, so that the spring 231 acting through the medium of the piston 229 and stem 230, maintains the valve 224 unseated.

When a sudden reduction in brake pipe pressure is effected to initiate an emergency application of the brakes, the equalizing valve device and emergency valve device move to emergency position in the same manner as hereinbefore described with the equipment conditioned for passenger train operations. Fluid under pressure from both the auxiliary reservoir and emergency reservoir now flows through the inshot valve mechanism, as above described, to the volume reservoir and relay piston chamber.

It will here be noted that when the emergency main slide valve 59 is moving toward emergency position it laps the passage 235 before the cavity 295 is brought into communication with the emergency reservoir passage 303, so that the inshot piston chamber 232 is maintained at atmospheric pressure.

Now, when the pressure of fluid being supplied to the volume reservoir 8 and relay piston chamber 186 through passages 239 and 189 and acting on inner seated area of the valve piston 229 becomes great enough to overcome the opposing force of the spring 231, said valve piston is moved to its extreme outer position permitting the spring 236 to seat the inshot valve 224, thus closing off the initial rapid flow of fluid to the volume reservoir and relay piston chamber. With the valve 224 thus seated, fluid under pressure continues to flow to the volume reservoir and relay piston chamber at a slow rate by way of the passage in the choke plug 240.

The restriction in the passage 226 is provided for the purpose of limiting the rate of flow of fluid from the auxiliary reservoir and emergency reservoir to chamber 238 to a slower rate than that at which fluid is permitted to flow from the chamber to the volume reservoir 8 and relay piston chamber 186. This will prevent the pressure in chamber 238 from increasing sufficiently to cause the valve piston to move outwardly and permit the valve 224 to seat before the pressure of the volume reservoir and relay piston chamber has reached a corresponding pressure, and will, therefore, ensure against the premature closing of the valve.

Fluid at volume reservoir and relay piston chamber pressure acts on one side of the flexible diaphragm 223 and associated timing valve 18. The other side of the diaphragm is subjected to the reducing quick chamber pressure in the emergency slide valve chamber 61. When the increasing pressure on the first mentioned side of the diaphragm becomes sufficient to overcome the reducing quick action chamber pressure on the other side, said diaphragm is flexed outwardly, permitting fluid in chamber 246 to unseat the timing valve 18. With valve 18 unseated, fluid under pressure now flows from passage 125 and chamber 246, past the unseated valve 18, and through the choked passage 242, chamber 238 of the inshot valve mechanism 17, passages 239 and 189, and pipe 188 to the volume reservoir 8 and relay piston chamber 186, and since fluid under pressure continues to flow through the choke 240 in the inshot valve mechanism to the volume reservoir and relay piston chamber, this third stage of increase in volume reservoir and relay piston chamber pressure will be at a fairly fast rate, until the pressures of the auxiliary and emergency reservoirs equalize into the volume reservoir and relay piston chamber.

It will here be understood, that the relay valve device 7 will function under the different rates of increase in the pressure of fluid in the piston chamber 186 to control the increase in brake cylinder pressure at the same rates.

From the above description of the functioning of the inshot valve mechanism 17 and relay valve device 7 in effecting an emergency application of the brakes, it will be understood that although the supply of fluid under pressure to the brake cylinder is continuous from the time the emergency application is initiated, until the full brake cylinder pressure is developed, the increase in brake cylinder pressure is in three distinct steps or stages. First there is an initial limited quick inshot of fluid under pressure to the brake cylinder, then there is a slow increase in brake cylinder pressure, and finally there is a rapid increase in brake cylinder pressure. The initial inshot is such as to insure a predetermined light brake cylinder pressure being developed, say for instance about fifteen pounds, to set up a slight retardation on the cars to cause the slack in the train to gather or close gently. The following slow flow of fluid may only increase the brake cylinder pressure by about six pounds, but is of such duration as to permit the train slack on an empty train to sufficiently gather to prevent harsh shocks. The final rapid flow of fluid to the brake cylinder is for the purpose of bringing the train to a stop promptly after the slack in the train has gathered.

Aside from the operation of the inshot valve mechanism 17 and timing valve 18 to control the rate of increase in brake cylinder pressure as just described, the several parts and devices of the equipment function to control the brakes in substantially the same manner as when the equipment is conditioned for express train operations.

*Description of modification illustrated in Fig. 13*

There is a growing tendency towards the mounting of brake cylinders on the trucks of passenger equipment cars, such as passenger, mail and baggage cars, and in Fig. 13 there is illustrated a brake equipment for such cars, with the brake cylinders mounted on the car trucks. Due to clearance limitations, it may, in some instances, be impracticable to use take-up cylinders in conjunction with brake cylinders mounted on car trucks, and in the equipment shown in Fig. 13, take-up cylinders have been omitted.

In the equipment shown in Fig. 13, there are four brake cylinders 6 arranged two in parallel on each car truck, a relay valve device 7 for controlling the flow of fluid to and from each pair of brake cylinders, a supply reservoir 4 for each pair of brake cylinders, and a reduction reservoir 360 which is substituted for take-up cylinders. The brake controlling valve device comprising the equalizing valve device 24, emergency valve device 25, pipe bracket 21 and other parts and devices may be identical with the brake controlling valve device hereinbefore described in detail.

It will be understood that the equipment may be changed over or conditioned for passenger, express and long freight train operations in the same manner as in the type of equipment shown in Figs. 1 to 12, inclusive, and that when changed over for any class of train service, will function in substantially the same manner to control the brakes.

It will, however, be noted that with the cut-in valve device 10 in its inner position, the initial flow of fluid from the auxiliary reservoir 2, in effecting an application of the brakes, is to the reduction reservoir 360. The volume of this reservoir is equivalent to the volume of the take-up cylinder used in the equipment shown in Figs. 1 to 12, inclusive, so that both equipments are adapted to operate in harmony with each other when both equipments are interposed in the same train.

When the brake cylinders are mounted on a car truck, the connection 197, through which fluid under pressure is adapted to be supplied to and released from each pair of brake cylinders, must be flexible and is usually in the form of a hose of the type usually employed in fluid pressure brake apparatus. Since there is relative movement between the truck and car body, this connection will be flexed many times in service and in time may leak or burst. If the connection 197 to one pair of cylinders should leak or burst, complete loss of brakes cannot occur, since the relay valve device 7 for the other pair of brake cylinders will function to supply fluid from the associated supply reservoir to this pair of brake cylinders.

While two illustrative embodiments of the invention have been described in detail, it is not our intention to limit its scope to these embodiments or otherwise than by the terms of the appended claims.

Having now described our invention, what we claim as new and desire to secure by Letters Patent, is:

1. In a fluid pressure brake, in combination, a brake controlling apparatus having certain brake controlling functions common to a plurality of classes of train service, said apparatus comprising an equalizing valve device and an emergency valve device, means adapted to be cut into cooperative relation with said equalizing and emergency valve devices for imparting other brake controlling functions to said apparatus for rendering the apparatus effective to control the brakes in a particular class of train service, valve means operative to cut said means into cooperative relation with said equalizing and emergency valve devices, and means subject to fluid under pressure for locking said valve means against movement from one position to another.

2. In a fluid pressure brake, in combination, a brake controlling apparatus having certain brake controlling functions common to passenger, express and freight train service, means adapted to be rendered operative for imparting other brake controlling functions to said apparatus for rendering the apparatus effective to control the brakes in passenger train service, means adapted to be rendered operative for imparting other brake controlling functions to said apparatus for rendering the apparatus effective to control the brakes in express train service, means adapted to be rendered operative for imparting other brake controlling functions to said apparatus for rendering the apparatus effective to control the brakes in freight train service, valve means operative to selectively render said means operative, and means for locking said valve means in its selected position.

3. In a fluid pressure brake, in combination, a brake controlling apparatus having certain brake controlling functions common to a plurality of classes of train service, said apparatus comprising an equalizing valve device and an emergency valve device, means adapted to be cut into cooperative relation with said equalizing and emergency valve devices for imparting other brake controlling functions to said apparatus for rendering the apparatus effective to control the brakes in a particular class of train service, valve means operative to cut said means into cooperative relation with said equalizing and emergency valve devices, and fluid pressure responsive means operated upon an increase in fluid pressure to a predetermined degree for locking said valve means against movement from one position to another and operated upon a reduction in fluid pressure below said predetermined degree for unlocking said valve means.

4. In a fluid pressure brake, in combination, a brake controlling apparatus having certain brake controlling functions common to passenger, express and freight train service, means adapted to be rendered operative for imparting other brake controlling functions to said apparatus for rendering the apparatus effective to control the brakes in passenger train service, means adapted to be rendered operative for imparting other brake controlling functions to said apparatus for rendering the apparatus effective to control the brakes in express train service, means adapted to be rendered operative for imparting other brake controlling functions to said apparatus for rendering the apparatus effective to control the brakes in freight train service, valve means operative to selectively render said means operative, and fluid pressure responsive means operated upon an increase in fluid pressure above a predetermined degree for locking said valve means in its selected position and operated upon a reduction in the fluid pressure below said predetermined degree for unlocking said valve means.

5. In a fluid pressure brake, in combination, a brake controlling apparatus having certain brake controlling functions common to a plurality of classes of train service, said apparatus comprising an equalizing valve device and an emergency valve device, means adapted to be cut into cooperative relation with said equalizing and emergency valve devices for imparting other brake controlling functions to said apparatus for rendering the apparatus effective to control the brakes in a particular class of train service, valve means operative to cut said means into cooperative relation with said equalizing and emergency valve devices, fluid pressure responsive means operated upon an increase in fluid pressure to a predetermined degree for locking said valve means against movement from one position to another and operated upon a reduction in fluid pressure below said predetermined degree for unlocking said valve means, and means operative to reduce the pressure of fluid holding said pressure responsive means in locking position.

6. In a fluid pressure brake, in combination, a brake controlling apparatus having certain brake controlling functions common to a plurality of classes of train service, said apparatus comprising an equalizing valve device and an emergency valve device, means adapted to be cut into cooperative relation with said equalizing and emergency valve devices for imparting other brake controlling functions to said apparatus for rendering the apparatus effective to control the brakes in a particular class of train service, valve means operative to cut said means into cooperative relation with said equalizing and emergency valve devices, fluid pressure responsive means operated upon an increase in fluid pressure to a predetermined degree for locking said valve means against movement from one position to another and operated upon a reduction in fluid pressure below said predetermined degree for unlocking said valve means, and valve means operative manually to reduce the pressure of fluid holding said pressure responsive means in locking position.

7. In a fluid pressure brake, in combination, a brake controlling apparatus, an auxiliary reservoir, a change-over valve device movable manually to different positions in which said apparatus is conditioned to function for different classes of service, means operated upon a predetermined increase in auxiliary reservoir pressure for locking said change-over valve device against movement from one position to another, and valve means operative to reduce the auxiliary reservoir pressure acting on said means.

8. In a fluid pressure brake, in combination, a brake controlling apparatus, an auxiliary reservoir adapted to be charged with fluid under pressure, a change-over valve device movable to different positions in which said apparatus is conditioned to function for different classes of service, means operated when the pressure of fluid in the auxiliary reservoir has been increased to a predetermined degree to lock said change-over valve device in any selected one of its different positions and operated upon a reduction in auxiliary reservoir pressure below said predetermined degree to unlock said valve means, and a reservoir release valve device operative to reduce the auxiliary reservoir pressure.

9. In a fluid pressure brake, in combination, a brake pipe, an auxiliary reservoir, an equalizing valve device subject to the opposing pressures of the auxiliary reservoir and the brake pipe and operated upon a reduction in brake pipe pressure for effecting an application of the brakes, and a change-over valve device controlling communication through which the auxiliary reservoir is charged with fluid under pressure from the brake pipe and having one position for charging the auxiliary reservoir at one rate and another position for charging the auxiliary reservoir at a different rate.

10. In a fluid pressure brake, in combination, a brake pipe, an auxiliary reservoir, an equalizing valve device subject to the opposing pressures of the auxiliary reservoir and the brake pipe and operated upon a reduction in brake pipe pressure for effecting an application of the brakes, and operated upon an increase in brake pipe pressure to effect the release of the brakes and to establish two communications through which fluid under pressure is adapted to flow from the brake pipe to the auxiliary reservoir, and a change-over valve device for controlling one of said communications and having one position for closing the communication and another position for opening the communication.

11. In a fluid pressure brake, in combination, a brake pipe, an auxiliary reservoir, an equalizing valve device subject to the opposing pressures of the auxiliary reservoir and the brake pipe and operated upon a reduction in brake pipe pressure for effecting an application of the brakes, and operated upon an increase in brake pipe pressure to effect the release of the brakes and to establish two communications through which fluid under pressure is adapted to flow from the brake pipe to the auxiliary reservoir, one of said communications being constantly open to the auxiliary reservoir, and a change-over valve device for controlling the other of said communications and having a position for closing said other communication and another position for opening said other communication.

12. In a fluid pressure brake, in combination, a brake pipe, an auxiliary reservoir, an equalizing valve device subject to the opposing pressures of the auxiliary reservoir and the brake pipe and operated upon a reduction in brake pipe pressure for effecting an application of the brakes, and operated upon an increase in brake pipe pressure to effect the release of the brakes and to establish communication from the brake pipe to two passages through which fluid is adapted to flow from the brake pipe to the auxiliary reservoir, one of said passages being in constant open communication with the auxiliary reservoir, and a change-over valve device operative to one position to permit the flow of fluid from the other of said passages to the auxiliary reservoir and operative to another position for closing the communication from said other passage to the auxiliary reservoir.

13. In a fluid pressure brake, in combination, a brake pipe, an auxiliary reservoir, an equalizing valve device comprising valve means operative to control the application and release of the brakes, a piston subject to the opposing pressures of the brake pipe and auxiliary reservoir and operated upon a reduction in brake pipe pressure for shifting said valve means to a brake applying position and operated upon an increase in brake pipe pressure to shift said valve means to a brake releasing position and to establish communication from the brake pipe to two passages through which fluid under pressure is adapted to flow from the brake pipe, one of said passages being in constant open communicaion with the auxiliary reservoir, and a change-over valve device operative to one position to permit the flow of fluid through the other of said passages to the auxiliary reservoir and operative to another position to prevent the flow of fluid from said other passage to the auxiliary reservoir.

14. In a fluid pressure brake, in combination, an auxiliary reservoir, an emergency reservoir, an equalizing valve device subject to the opposing pressures of the brake pipe and auxiliary reservoir and operated upon a reduction in brake pipe pressure for effecting an application of the brakes and operated upon an increase in brake pipe pressure for effecting the release of the brakes, for establishing communication through which the auxiliary reservoir is charged with fluid under pressure and for establishing communication through which the emergency reservoir is charged with fluid under pressure, and a change-over valve device controlling communication through which the auxiliary reservoir and emergency reservoir are charged with fluid under pressure and having one position for charging the auxiliary reservoir and emergency reservoirs at certain rates and having another position for charging the reservoirs at different rates.

15. In a fluid pressure brake, in combination, an auxiliary reservoir, an emergency reservoir, an equalizing valve device subject to the opposing pressures of the brake pipe and auxiliary reservoir and operated upon a reduction in brake pipe pressure for effecting an application of the brakes and operated upon an increase in brake pipe pressure for effecting the release of the brakes, for establishing communication through which the auxiliary reservoir is charged with fluid under pressure and for establishing communication through which the emergency reservoir is charged with fluid under pressure and through which fluid under pressure is adapted to flow from the emergency reservoir to the auxiliary reservoir when the auxiliary reservoir pressure is lower than the emergency reservoir pressure, and a change-over valve device controlling said communications and having one position for charging the auxiliary reservoir at a certain rate and for charging the emergency reservoir at a certain rate and having another position for charging the auxiliary reservoir at a different rate and for charging the emergency reservoir at a different rate, said change-over valve device in its first mentioned position providing for a certain rate of flow of fluid from the emergency reservoir to the auxiliary reservoir and in its other position providing for a different rate of flow of fluid from the emergency reservoir to the auxiliary reservoir.

16. In a fluid pressure brake, in combination, an auxiliary reservoir, an emergency reservoir, an equalizing valve device subject to the opposing pressures of the brake pipe and auxiliary reservoir and operated upon a reduction in brake pipe pressure for effecting an application of the brakes and operated upon an increase in brake pipe pressure for effecting the release of the brakes, for establishing communication through which the auxiliary reservoir is charged with fluid under pressure and for establishing communication through which the emergency reservoir is charged with fluid under pressure and through which fluid under pressure is adapted to flow from the emergency reservoir to the auxiliary reservoir when the auxiliary reservoir pressure is lower than the emergency reservoir pressure, and a change-over valve device controlling said communications and having one position for charging the auxiliary reservoir at a certain rate and for providing for a certain rate of flow of fluid to or from the emergency reservoir, and having another position for charging the auxiliary reservoir at a different rate and for changing the rate of flow of fluid to or from the emergency reservoir.

17. In a fluid pressure brake, in combination, a brake pipe, a brake controlling valve device operated by variations in brake pipe pressure for effecting the application and release of the brakes, means included in the brake controlling valve device for venting fluid under pressure from the brake pipe in effecting an application of the brakes, means for varying the rate of flow of fluid from the brake pipe, and a change-over valve device having one position in which the second mentioned means is rendered ineffective to vary the rate of flow of fluid from the brake pipe and another position in which the second mentioned means is rendered effective to vary the rate of flow of fluid from the brake pipe.

18. In a fluid pressure brake, in combination, a brake pipe, a brake controlling valve device operated by variations in brake pipe pressure for effecting the application and release of the brakes, means included in the brake controlling valve device for venting fluid under pressure from the brake pipe in effecting an application of the brakes, means for controlling the rate of flow of fluid from the brake pipe to provide for an initial fast rate of flow and then a slower rate of flow, and a change-over valve device having one position in which the second mentioned means is rendered ineffective to vary the rate of flow of fluid from the brake pipe and another position in which the second mentioned means is rendered effective to vary the rate of flow of fluid from the brake pipe.

19. In a fluid pressure brake, in combination, a brake pipe, a brake controlling valve device operated by variations in brake pipe pressure for effecting the application and release of the brakes, means included in the brake controlling valve device for venting fluid under pressure from the brake pipe in effecting an application of the brakes, valve means operative to vary the rate of flow of fluid from the brake pipe, and a change-over valve device having one position in which said valve means is rendered ineffective to vary the rate of flow of fluid from the brake pipe and having another position in which said valve means is rendered effective to vary the rate of flow of fluid from the brake pipe.

20. In a fluid pressure brake, in combination, a brake pipe, a brake controlling valve device operated by variations in brake pipe pressure for effecting the application and release of the brakes, means included in the brake controlling valve device for venting fluid under pressure from the brake pipe in effecting an application of the brakes, means operative according to a certain degree of brake application for varying the rate of flow of fluid from the brake pipe, and a change-over valve device having one position in which the second mentioned means is rendered ineffective to vary the rate of flow of fluid from the brake pipe and having another position in which said means is rendered effective to vary the rate of flow of fluid from the brake pipe.

21. In a fluid pressure brake, in combination, a brake pipe, a brake controlling valve device operated by variations in brake pipe pressure for effecting the application and release of the brakes, means included in the brake controlling valve device for venting fluid under pressure from the brake pipe in effecting an application of the brakes, means operated upon a predetermined increase in the pressure of fluid in the communication through which fluid is vented from the brake pipe for varying the rate of flow of fluid from the brake pipe, and a change-over valve device having one position for rendering the second mentioned means ineffective to vary the rate of flow of fluid from the brake pipe and having another position in which the second mentioned means is rendered effective to vary the rate of flow of fluid from the brake pipe.

22. In a fluid pressure brake, in combination, a brake pipe, a brake controlling valve device operated by variations in brake pipe pressure for effecting the application and release of the brakes, means included in the brake controlling valve device for effecting an initial quick service flow of fluid from the brake pipe upon movement of the means toward brake applying position and for effecting a final quick service flow of fluid from the brake pipe upon movement of the means to brake applying position, valve means for varying the rate of the final quick service flow of fluid from the brake pipe, and a change-over valve device having one position for rendering said valve means effective to control the rate of the final quick service flow of fluid from the brake pipe and having another position for rendering said valve means ineffective to control the rate of the final quick service flow of fluid from the brake pipe.

23. In a fluid pressure brake, in combination, a brake pipe, a brake controlling valve device operated by variations in brake pipe pressure for effecting the application and release of the brakes, means included in the brake controlling valve device for effecting an initial quick service flow of fluid from the brake pipe upon movement of the means toward brake applying position and for effecting a final quick service flow of fluid from the brake pipe upon movement of the means to brake applying position, valve means for varying the rate of the final quick service flow of fluid from the brake pipe, and a change-over valve device having one position for rendering said valve means effective to control the rate of the final quick service flow of fluid from the brake pipe and having another position for rendering said valve means ineffective to control the rate of the final quick service flow of fluid from the brake pipe, and to render the valve means effective to control the amount of final quick service flow of fluid from the brake pipe.

24. In a fluid pressure brake, in combination, a brake pipe, a brake controlling valve device operated by variations in brake pipe pressure for effecting the application and release of the brakes and to connect the brake pipe to two quick service passages through which fluid is vented from the brake pipe, means operative upon a predetermined increase in fluid pressure for closing off the quick service flow of fluid through one of said quick service passages, and a change-over valve operative to one position for permitting the quick service flow of fluid through the other of said quick service passages and having another position for preventing the flow of fluid through said other quick service passage.

25. In a fluid pressure brake, in combination, a brake pipe, a brake controlling valve device operated by variations in brake pipe pressure for effecting the application and release of the brakes, and to connect the brake pipe to two quick service passages through which fluid is vented from the brake pipe, means operative upon a predetermined increase in fluid pressure for closing off the quick service flow of fluid through one of said quick service passages, and a change-over valve operative to one position for permitting the quick service flow of fluid through the other of said quick service passages and having another position for preventing the flow of fluid through said other quick service passage, said means being operative in said other position of the change-over valve device to limit the amount of quick service flow of fluid from the brake pipe.

26. In a fluid pressure brake, in combination, a brake pipe, a brake controlling valve device operated by variations in brake pipe pressure for effecting the application and release of the brakes and to connect the brake pipe to two quick service passages through which fluid is vented from the brake pipe, means operative upon a predetermined increase in fluid pressure for closing off the quick service flow of fluid through one of said quick service passages, and a change-over valve operative to one position for permitting the quick service flow of fluid through the other of said quick service passages and having another position for preventing the flow of fluid through said other quick service passage, said means being operative in either of the positions of the change-over valve device to limit the amount of quick service flow of fluid through the first mentioned quick service passage.

27. In a fluid pressure brake, in combination, a brake pipe, an equalizing valve device operated upon a reduction in brake pipe pressure for effecting a service application of the brakes, means operative in service application position for effecting a quick service venting of fluid from the brake pipe to a limited extent, other means operative in service application position for venting fluid from the brake pipe at a restricted rate, and a change-over valve device movable to one position in which said other means is operative and to another position in which said other means is rendered inoperative to vent fluid from the brake pipe.

28. In a fluid pressure brake, in combination, a brake pipe, an equalizing valve device operated upon a reduction in brake pipe pressure for effecting a service application of the brakes, means operative in service application position for effecting a quick service venting of fluid from the brake pipe to a limited extent, other means operative in service application position for venting fluid from the brake pipe at a restricted rate, and a change-over valve device movable to one position in which said other means is operative and to another position in which said other means is rendered inoperative to vent fluid from the brake pipe, and in which the first mentioned means is maintained operative to limit the quick service flow of fluid from the brake pipe.

29. In a fluid pressure brake, in combination, a brake pipe, a brake controlling valve device comprising a single triple valve device operated by variations in brake pipe pressure for effecting the application and release of the brakes in each of a plurality of classes of train service and including valve mechanism having means for effecting graduated release of the brakes and means for effecting a quick service operation in effecting a service application of the brakes, and a change-over valve device having one position in which both of said means is rendered ineffective and another position in which both of said means are effective.

30. In a fluid pressure brake, in combination, a brake pipe, an equalizing valve device comprising a main slide valve, a graduating slide valve having a movement relative to the main slide valve and a piston subject to variations in brake pipe pressure for operating said valves, said main valve being adapted in release position to establish a communication through which fluid under pressure is released to effect the release of the brakes, and said graduating valve being adapted in release position to establish another communication through which fluid is released to effect a release of the brakes, and a change-over valve device movable to a position in which the first communication is open to the atmosphere and the other communication is cut off from the atmosphere.

31. In a fluid pressure brake, in combination, a brake pipe, an equalizing valve device comprising a main slide valve, a graduating slide valve having a movement relative to the main slide valve and a piston subject to variations in brake pipe pressure for operating said valves, said main valve being adapted in release position to establish a communication through which fluid under pressure is released to effect the release of the brakes, and said graduating valve being adapted in release position to establish another communication through which fluid is released to effect a release of the brakes, and a change-over valve device movable to a position in which the first communication is open to the atmosphere and the other communication is cut off from the atmosphere and movable to another position in which said first communication is cut off from the atmosphere, and the other communication is open to the atmosphere.

32. In a fluid pressure brake, in combination, a brake pipe, an auxiliary reservoir, an emergency reservoir, an equalizing valve device subject to the opposing pressures of the brake pipe and auxiliary reservoir and operated upon a reduction in brake pipe pressure for effecting an application of the brakes, said equalizing valve device being adapted upon movement to release position to establish communication from said emergency reservoir to the auxiliary reservoir, and a change-over valve device movable to one position in which fluid under pressure is supplied from the emergency reservoir through said communication at a relatively rapid rate to provide for graduated release operation of said equalizing valve device and movable to another position in which fluid under pressure is supplied from the emergency reservoir at a more restricted rate.

33. In a fluid pressure brake, in combination, a brake pipe, a main brake cylinder, a take-up brake cylinder, an equalizing valve device operated upon a reduction in brake pipe pressure for supplying fluid under pressure to said take-up brake cylinder, a relay valve device operated by fluid under pressure for supplying fluid under pressure to said main brake cylinder, a cut-in valve device operative upon a predetermined increase in the pressure of fluid supplied to said take-up brake cylinder for establishing a communication through which said equalizing valve device supplies fluid under pressure to said relay valve device.

34. In a fluid pressure brake, in combination, a brake pipe, a main brake cylinder, a take-up brake cylinder, an equalizing valve device operated upon a reduction in brake pipe pressure for supplying fluid under pressure to said take-up brake cylinder, a relay valve device operated by fluid under pressure for supplying fluid under pressure to said main brake cylinder, a cut-in valve device operative upon a predetermined increase in the pressure of fluid supplied to said take-up brake cylinder for cutting off communication through which said equalizing valve device supplies fluid under pressure to said take-up brake cylinder and for controlling a communication through which said equalizing valve device supplies fluid under pressure to said relay valve device.

35. In a fluid pressure brake, in combination, a brake pipe, a main brake cylinder, a take-up brake cylinder, an equalizing valve device operated upon a reduction in brake pipe pressure for supplying fluid under pressure to said take-up brake cylinder, a relay valve device operated by fluid under pressure for supplying fluid under pressure to said main brake cylinder, a cut-in valve device operative upon a predetermined increase in the pressure of fluid supplied to said take-up brake cylinder for establishing a communication through which said equalizing valve device supplies fluid under pressure to said relay valve device, and a change-over valve device having one position for establishing said communication and another position in which said communication is cut off.

36. In a fluid pressure brake, in combination, a brake pipe, a main brake cylinder, a take-up brake cylinder, an equalizing valve device operated upon a reduction in brake pipe pressure for supplying fluid under pressure to said take-up brake cylinder, a cut-in valve device operative upon a predetermined increase in the pressure of fluid supplied to the take-up brake cylinder for establishing a communication through which said equalizing valve device supplies fluid under pressure to effect the supply of fluid under pressure to said main brake cylinder and for isolating the take-up brake cylinder from said communication.

37. In a fluid pressure brake, in combination, a brake pipe, an auxiliary reservoir, a supply reservoir, a main brake cylinder, a take-up brake cylinder, an equalizing valve device operated upon a reduction in brake pipe pressure for supplying fluid under pressure from the auxiliary reservoir to the take-up brake cylinder, a relay valve device operated by fluid under pressure from the auxiliary reservoir for supplying fluid under pressure from said supply reservoir to the main brake cylinder, a cut-in valve device operative upon a predetermined increase in the pressure of fluid supplied to the take-up brake cylinder for establishing a communication through which said equalizing valve device supplies fluid under pressure to said relay valve device.

38. In a fluid pressure brake, in combination, a brake pipe, an auxiliary reservoir, a supply reservoir, a main brake cylinder, a take-up brake cylinder, an equalizing valve device operated upon a reduction in brake pipe pressure for supplying fluid under pressure from the auxiliary reservoir to the take-up brake cylinder, a relay valve device operated by fluid under pressure from the auxiliary reservoir for supplying fluid under pressure from said supply reservoir to the main brake cylinder, a cut-in valve device establishing communication through which the equalizing valve device supplies fluid under pressure from the auxiliary reservoir to the take-up brake cylinder and operative upon a predetermined increase in the pressure of fluid supplied to the take-up brake cylinder for cutting off said communication and for establishing a communication through which said equalizing valve device supplies fluid under pressure from the auxiliary reservoir to the relay valve device.

39. In a fluid pressure brake, in combination, a brake pipe, a main brake cylinder, a take-up brake cylinder, a relay valve device operative by fluid under pressure for supplying fluid under pressure to the main brake cylinder, a cut-in valve device normally establishing communication through which the take-up brake cylinder is connected to the atmosphere, a communication through which fluid under pressure is adapted to be supplied to the take-up brake cylinder, and an equalizing valve device operative upon a reduction in brake pipe pressure for closing the first mentioned communication and for supplying fluid under pressure through the second mentioned communication to the take-up brake cylinder and to the cut-in valve device, said cut-in valve device being operated upon a predetermined increase in the pressure supplied by the equalizing valve device to cut off the flow of fluid to the take-up brake cylinder and to supply fluid under pressure to said relay valve device.

40. In a fluid pressure brake, in combination, a brake pipe, a main brake cylinder, a take-up brake cylinder, a relay valve device operative by fluid under pressure for supplying fluid under pressure to the main brake cylinder, a cut-in valve device normally establishing communication through which the take-up brake cylinder is connected to the atmosphere, a communication through which fluid under pressure is adapted to be supplied to the take-up brake cylinder, and an equalizing valve device operative upon a reduction in brake pipe pressure for closing the first mentioned communication and for supplying fluid under pressure through the second mentioned communication to the take-up brake cylinder and to the cut-in valve device, said cut-in valve device being operated upon a predetermined increase in the pressure supplied by the equalizing valve device to cut off the flow of fluid to the take-up brake cylinder and to supply fluid under pressure to said relay valve device, said equalizing valve device being operative upon an increase in brake pipe pressure to vent fluid under pressure from the relay valve device independently of the cut-in valve device.

41. In a fluid pressure brake, in combination, a brake pipe, a main brake cylinder, a take-up brake cylinder, a relay valve device operative by fluid under pressure for supplying fluid under pressure to the main brake cylinder, a cut-in valve device normally establishing communication through which the take-up brake cylinder is connected to the atmosphere, a communication through which fluid under pressure is adapted to be supplied to the take-up brake cylinder, and an equalizing valve device operative upon a reduction in brake pipe pressure for closing the first mentioned communication and for supplying fluid under pressure through the second mentioned communication to the take-up brake cylinder and to the cut-in valve device, said cut-in valve device being operated upon a predetermined increase in the pressure supplied by the equalizing valve device to cut off the flow of fluid to the take-up brake cylinder and to supply fluid under pressure to said relay valve device, said equalizing valve device being operative upon an increase in brake pipe pressure to vent fluid under pressure from the relay valve device independently of the cut-in valve device and to vent fluid under pressure from the cut-in valve device to effect the operation of the cut-in valve device to vent fluid under pressure from the take-up brake cylinder.

42. In a fluid pressure brake, in combination, a brake pipe, a main brake cylinder, a take-up brake cylinder, an equalizing valve device operated upon a reduction in brake pipe pressure for supplying fluid under pressure to the take-up brake cylinder, a relay valve device operated by fluid under pressure for supplying fluid under pressure to the main brake cylinder, and a cut-in valve device normally establishing communication through which fluid under pressure supplied by the equalizing valve device flows to the take-up brake cylinder and operated upon a predetermined increase in the pressure of fluid supplied to the take-up brake cylinder for cutting off said communication and for establishing a communication through which said equalizing valve device supplies fluid under pressure to said relay valve device.

43. In a fluid pressure brake, in combination, a brake pipe, a main brake cylinder, a take-up brake cylinder, an equalizing valve device operated upon a reduction in brake pipe pressure for supplying fluid under pressure to the take-up brake cylinder, a relay valve device operated by fluid under pressure for supplying fluid under pressure to the main brake cylinder, and a cut-in valve device normally establishing communication through which fluid under pressure supplied by the equalizing valve device flows to the take-up brake cylinder and operated upon a predetermined increase in the pressure of fluid supplied to the take-up brake cylinder for cutting off said communication and for establishing a communication through which said equalizing valve device supplies fluid under pressure to said relay valve device, said equalizing valve device being operative upon an increase in brake pipe pressure to vent fluid under pressure to effect the operation of said relay device to vent fluid under pressure from the main brake cylinder and to vent fluid under pressure to effect the operation of the cut-in valve device to vent fluid under pressure from the take-up brake cylinder.

44. In a fluid pressure brake, in combination, a brake pipe, a main brake cylinder, a take-up brake cylinder, an equalizing valve device operated upon a reduction in brake pipe pressure for supplying fluid under pressure to the take-up brake cylinder, a relay valve device operated by fluid under pressure for supplying fluid under pressure to the main brake cylinder, and a cut-in valve device normally establishing communication through which fluid under pressure supplied by the equalizing valve device flows to the take-up brake cylinder and operated upon a predetermined increase in the pressure of fluid supplied to the take-up brake cylinder to a position for cutting off said communication and for establishing a communication through which said equalizing valve device supplies fluid under pressure to said relay valve device, said cut-in valve device being maintained in said position by fluid under pressure supplied by the equalizing valve device, said equalizing valve device being operated upon an increase in brake pipe pressure for venting fluid under pressure to effect the operation of said relay valve device to vent fluid under pressure from the main brake cylinder and for venting the actuating fluid pressure in said cut-in valve device to effect the operation of the cut-in valve device to vent fluid under pressure from the take-up brake cylinder.

45. In a fluid pressure brake, in combination, a brake pipe, a brake controlling valve device operated upon a sudden reduction in brake pipe pressure for supplying fluid under pressure to effect an emergency application of the brakes, an inshot valve device for controlling the flow of fluid under pressure in effecting an emergency application of the brakes and operated upon a predetermined increase in the pressure of fluid supplied in effecting an emergency application of the brakes for restricting the rate at which fluid is supplied for effecting an emergency application, and a change-over valve device movable to a position in which fluid under pressure is supplied in effecting an emergency application of the brakes independently of said inshot valve device.

46. In a fluid pressure brake, in combination, a brake pipe, a brake controlling valve device operated upon a sudden reduction in brake pipe pressure for supplying fluid under pressure to effect an emergency application of the brakes, means for regulating the flow of fluid under pressure in effecting an emergency application of the brakes, and a change-over valve device having a position in which communication is established for supplying fluid under pressure in effecting an emergency application of the brakes independently of said means.

47. In a fluid pressure brake, in combination, a brake pipe, a brake controlling valve device operated upon a sudden reduction in brake pipe pressure for supplying fluid under pressure to effect an emergency application of the brakes, means for regulating the flow of fluid under pressure in effecting an emergency application of the brakes, and a change-over valve device having a position in which communication is established for supplying fluid under pressure in effecting an emergency application of the brakes independently of said means and having another position in which said communication is cut off.

48. In a fluid pressure brake, in combination, a brake pipe, a brake controlling valve device operated upon a sudden reduction in brake pipe pressure for supplying fluid under pressure to effect an emergency application of the brakes, means for regulating the flow of fluid under pressure in effecting an emergency application of the brakes, and a change-over valve device having a position in which the flow of fluid in effecting an emergency application of the brakes is regulated by said means and having another position in which the flow of fluid is without regulation by said means.

49. In a fluid pressure brake, in combination, a brake pipe, a brake cylinder, a relay valve device operative by fluid under pressure for supplying fluid under pressure to the brake cylinder, a brake controlling valve device operated upon a sudden reduction in brake pipe pressure to supply fluid under pressure to said relay valve device to cause said relay valve device to function to supply fluid under pressure to the brake cylinder to effect an emergency application of the brakes, means for regulating the flow of fluid under pressure to the relay valve device, and a change-over valve device having a position in which communication is established for supplying fluid under pressure to the relay valve device in effecting an emergency application of the brakes independently of said means.

50. In a fluid pressure brake, in combination, a brake pipe, a brake cylinder, a relay valve device operative by fluid under pressure for supplying fluid under pressure to the brake cylinder, a brake controlling valve device operated upon a sudden reduction in brake pipe pressure to supply fluid under pressure to said relay valve device to cause said relay valve device to function to supply fluid under pressure to the brake cylinder to effect an emergency application of the brakes, means for regulating the flow of fluid under pressure to the relay valve device, and a change-over valve device having a position in which the flow of fluid to the relay valve device is regulated by said means and having another position in which the flow of fluid to the relay valve device is without regulation by said means.

51. In a fluid pressure brake, in combination, a brake pipe, a brake cylinder, a relay valve device operative by fluid under pressure for supplying fluid under pressure to the brake cylinder, a brake controlling valve device operated upon a sudden reduction in brake pipe pressure to supply fluid under pressure to said relay valve device to cause said relay valve device to function to supply fluid under pressure to the brake cylinder to effect an emergency application of the brakes, means for regulating the flow of fluid under pressure to the relay valve device, and a change-over valve device having a position in which the flow of fluid to the relay valve device is regulated by said means and having another position in which the flow of fluid to the relay valve device is at a substantially constant rate.

52. In a fluid pressure brake, in combination, a brake pipe, a brake controlling valve device operated upon a sudden reduction in brake pipe pressure for supplying fluid under pressure to effect an emergency application of the brakes, a valve device for controlling the flow of fluid under pressure supplied by the brake controlling valve device and adapted to be operated upon a predetermined increase in the pressure of fluid supplied by the brake controlling valve device for restricting the rate at which fluid is supplied in effecting an emergency application of the brakes, and a change-over valve device having one position in which said valve device operates to vary the rate of flow of fluid in effecting an emergency application and having another position in which the flow of fluid in effecting an emergency application of the brakes is at a substantially constant rate.

53. In a fluid pressure brake, in combination, a brake pipe, a brake controlling valve device operated upon a sudden reduction in brake pipe pressure for supplying fluid under pressure to effect an emergency application of the brakes, means adapted to be operated in effecting an emergency application of the brakes to vary the rate of flow of fluid supplied by said brake controlling valve device, and a change-over valve device having one position in which said means is effective to vary the rate of flow of fluid supplied by the brake controlling valve device and having another position in which the flow of fluid under pressure to effect an emergency application of the brakes is at a substantially constant rate.

54. In a fluid pressure brake, in combination, a brake pipe, a brake controlling valve device operated upon a sudden reduction in brake pipe pressure for supplying fluid under pressure to effect an emergency application of the brakes, means adapted to be operated in effecting an emergency application of the brakes to vary the rate of flow of fluid supplied by said brake controlling valve device, and a change-over valve device having one position in which said means is effective to vary the rate of flow of fluid supplied by the brake controlling valve device and having another position in which said means is rendered ineffective to control the rate of flow of fluid in effecting an emergency application of the brakes.

55. In a fluid pressure brake, in combination, a brake pipe, a brake controlling valve device operated by variations in brake pipe pressure for effecting the application and release of the brakes and including means for effecting a continuous quick service action in service application position, graduated release of the brakes and a controlled build-up of brake cylinder pressure in effecting an emergency application of the brakes, and a change-over valve device movable to one position in which said means is effective to provide continuous quick service action in service application position and graduated release and ineffective to provide controlled build-up of brake cylinder pressure in emergency, another position in which said means is ineffective to provide said continuous quick service, graduated release, and controlled build-up of brake cylinder pressure, and a third position in which said means is effective to provide controlled build-up of brake cylinder pressure in an emergency application of the brakes.

56. In a fluid pressure brake, in combination, a brake pipe, a brake controlling valve device operated by variations in brake pipe pressure for effecting the application and release of the brakes and including means for effecting a continuous quick service action in service application position, means for effecting a graduated release of the brakes and means for effecting a controlled build-up of brake cylinder pressure in effecting an emergency application of the brakes, and a change-over valve device movable to one position for rendering the first and second mentioned means effective and movable to another position for rendering the first and second mentioned means ineffective and the third mentioned means effective.

57. In a fluid pressure brake, in combination, a brake pipe, a brake controlling valve device operated by variations in brake pipe pressure for effecting the application and release of the brakes and including means for effecting a varying continuous quick service action in service application position, graduated release of the brakes and a controlled build-up of brake cylinder pressure in effecting an emergency application of the brakes, and a change-over valve device movable to one position in which said means is effective to provide continuous quick service action in service application position and graduated release and ineffective to provide controlled build-up of brake cylinder pressure in emergency, another position in which said means is ineffective to provide said continuous quick service, graduated release, and controlled build-up of brake cylinder pressure, and a third position in which said means is effective to provide controlled build-up of brake cylinder pressure in an emergency application of the brakes.

58. In a fluid pressure brake, in combination, a brake pipe, a brake controlling valve device operated by variations in brake pipe pressure for effecting the application and release of the brakes and including means for effecting a continuous quick service action in service application position, limited quick service action, graduated release of the brakes and a controlled build-up of brake cylinder pressure in effecting an emergency application of the brakes, and a change-over valve device movable to one position in which said means is effective to provide continuous quick service action in service application position and graduated release and ineffective to provide controlled build-up of brake cylinder pressure in emergency, another position in which said means is ineffective to provide said continuous quick service, graduated release, and controlled build-up of brake cylinder pressure and effective to provide said limited quick service action, and a third position in which said means is effective to provide controlled build-up of brake cylinder pressure in an emergency application of the brakes.

59. In a fluid pressure brake, in combination, a brake pipe, a brake controlling valve device operated upon a sudden reduction in brake pipe pressure for supplying fluid under pressure to effect an emergency application of the brakes, valve means operated upon a predetermined increase in the pressure of fluid supplied by said brake controlling valve device for restricting the rate at which fluid is supplied in effecting an emergency application of the brakes and means for controlling the rate at which fluid is supplied to said valve means to prevent the pressure in said valve means from being prematurely increased.

60. In a fluid pressure brake, in combination, a brake pipe, a brake controlling valve device operated upon a sudden reduction in brake pipe pressure for supplying fluid under pressure to effect an emergency application of the brakes, valve means normally establishing a communication through which fluid under pressure supplied by said brake controlling valve device flows and operated upon a predetermined increase in the pressure of fluid supplied by the brake controlling valve device for restricting the rate at which fluid is supplied to effect an emergency application of the brakes, and means for restricting the rate at which fluid under pressure is supplied to the valve means to prevent the pressure of fluid in said valve means from increasing at such a fast rate as to cause the valve means to operate prematurely to restrict the flow of fluid.

61. In a fluid pressure brake, in combination, a brake pipe, a brake controlling valve device operated upon a sudden reduction in brake pipe pressure for supplying fluid under pressure to effect an emergency application of the brakes, valve means normally establishing a communication through which fluid under pressure supplied by said brake controlling valve device flows and operated upon a predetermined increase in the pressure of fluid supplied by the brake controlling valve device for restricting the rate at which fluid is supplied to effect an emergency application of the brakes, means restricting the flow of fluid to said valve means to a rate less than that of the flow of fluid from said valve means to prevent a premature increase in the pressure of fluid in the valve means sufficient to cause the valve means to restrict the flow of fluid therefrom.

62. In a fluid pressure brake, in combination, a brake pipe, an auxiliary reservoir, a brake cylinder, a supply reservoir, a relay valve device operative by fluid under pressure for supplying fluid under pressure to the brake cylinder and operated upon a reduction in the pressure of fluid supplied thereto for venting fluid under pressure from the brake cylinder, a brake controlling valve device operated upon a reduction in brake pipe pressure for supplying fluid under pressure from the auxiliary reservoir to the relay valve device and operated upon an increase in brake pipe pressure for venting fluid therefrom, said relay valve device having a restricted communication through which the supply reservoir is adapted to be charged with fluid under pressure from the brake pipe, and a check valve adapted to prevent back flow of fluid from the supply reservoir to the brake pipe.

63. In a fluid pressure brake, in combination, a brake pipe, an auxiliary reservoir, a brake cylinder, a supply reservoir, a relay valve device operative by fluid under pressure for supplying fluid under pressure to the brake cylinder and operated upon a reduction in the pressure of fluid supplied thereto for venting fluid under pressure from the brake cylinder, a brake controlling valve device operated upon a reduction in brake pipe pressure for supplying fluid under pressure from the auxiliary reservoir to the relay valve device and operated upon an increase in brake pipe pressure for venting fluid therefrom, said relay valve device having a restricted communication through which the supply reservoir is adapted to be charged with fluid under pressure from the brake pipe, a strainer in said communication, and a check valve interposed between said strainer and supply reservoir adapted to prevent back flow of fluid from the supply reservoir to the brake pipe.

64. In a fluid pressure brake, in combination, a brake pipe, a brake controlling valve device comprising a piston subject to brake pipe pressure, a main slide valve operated by said piston and controlling a communication through which fluid is adapted to be released to effect a release of the brakes, a graduating slide valve operated by said piston and controlling a communication through which fluid is adapted to be released to effect a release of the brakes, a change-over valve device having one position for connecting one of the communications with the atmosphere and another position for connecting the other communication with the atmosphere, and means for actuating said change-over valve device.

65. In a fluid pressure brake, in combination, a brake pipe, a brake controlling valve device comprising a piston subject to brake pipe pressure, a main slide valve and a graduating slide valve operated by said piston and having a release position in which both of said valves establish a communication through which fluid is adapted to be released to effect a release of the brakes and in which said main valve establishes a communication through which fluid is adapted to be released to effect a release of the brakes, and a change-over valve device having one position for connecting one of the communications with the atmosphere and having another position in which the other communication is connected with the atmosphere.

66. In a fluid pressure brake apparatus adapted to be selectively conditioned for passenger, express and freight train service, a triple valve device included in the apparatus and operative in controlling the brakes in each class of train service, direct brake release means included in the triple valve device, graduated brake release means included in the triple valve device, and means operative to one position for conditioning the apparatus for passenger train service which includes the rendering of the graduated release means effective and the direct brake release means ineffective and operative to another position for conditioning the apparatus for express train service and operative to still another position for conditioning the apparatus for freight train service, the conditioning of the apparatus for express and freight train service including the rendering of the direct brake release means effective and the graduated brake release means ineffective.

67. In a fluid pressure brake apparatus adapted to be selectively conditioned for passenger, express and freight train service, a triple valve device included in the apparatus and operative in controlling the brakes in each class of train service, direct brake release means included in the triple valve device, graduated brake release means included in the triple valve device, valve means having a position for conditioning the apparatus for passenger train service, a position for conditioning the apparatus for express train service and a position for conditioning the apparatus for freight train service, said means when in position for conditioning the apparatus for passenger train service rendering the graduated brake release means effective and the direct brake release means ineffective and when in either of the two other positions rendering the direct brake release means effective and the graduated brake release means ineffective, and means for actuating said valve means.

68. In a fluid pressure brake apparatus adapted to be selectively conditioned for passenger, express and freight train service, in combination, a brake pipe, an auxiliary reservoir, a triple valve device included in the apparatus operative upon an increase in brake pipe pressure in each class of train service for charging said auxiliary reservoir with fluid under pressure, means adapted to provide for the charging of the auxiliary reservoir at a relatively rapid rate, means adapted to provide for the charging of the auxiliary reservoir at a relatively slow rate, means having a position for conditioning the apparatus for passenger train service and in which the first mentioned means is rendered effective to control the rate of charge of the auxiliary reservoir and having a position for conditioning the apparatus for express train service and having still another position for conditioning the apparatus for freight train service in either of which two latter positions the second mentioned means is rendered effective to control the rate of charge of the auxiliary reservoir.

69. In a fluid pressure brake, in combination, a brake pipe, a main brake cylinder, a take-up brake cylinder, a brake controlling valve device operated upon a reduction in brake pipe pressure for supplying fluid under pressure to the take-up brake cylinder, a relay valve device operated upon an increase in the pressure of fluid in a chamber for supplying fluid under pressure to the main brake cylinder, and means controlled by said brake controlling valve device for supplying fluid under pressure to said chamber.

70. In a fluid pressure brake, in combination, a brake pipe, a brake controlling apparatus comprising a single triple valve device responsive to variations in brake pipe pressure in each of a plurality of classes of train service to initiate the application and release of the brakes, control means adapted to be selectively associated with said valve device to condition the apparatus for a particular class of train service, certain of said control means being adapted to regulate the rate of recharge of the apparatus with fluid under pressure and certain other of said control means being adapted to regulate the manner of releasing the brakes, and means operative to selectively associate said control means with said valve device according to the class of train service in which the apparatus is employed.

71. In a fluid pressure brake, in combination, a brake pipe, a brake controlling apparatus comprising a single triple valve device, a single emergency valve device, said valve devices being responsive to variations in brake pipe pressure in each of a plurality of classes of train service to initiate the application and release of the brakes, control means adapted to be selectively associated with said valve devices to condition the apparatus for a particular class of train service, certain of said control means being adapted to regulate the rate at which an application of the brakes is effected, certain other of said control means being adapted to regulate the rate of charge of the apparatus with fluid under pressure and certain other of said control means being adapted to regulate the manner of releasing the brakes, and means operative to selectively associate said control means with said valve devices according to the class of train service in which the apparatus is employed.

72. In a fluid pressure brake, in combination, a brake pipe, a brake controlling valve device operated by variations in brake pipe pressure for effecting the application and release of the brakes, said brake controlling valve device including a piston which is at all times subject to brake pipe pressure, means controlled by said piston for effecting a graduated release of the brakes and means also controlled by said piston for effecting a full release of the brakes, and means operative to selectively render one or the other of the release means effective to control the release of the brakes.

73. In a fluid pressure brake, in combination, a brake pipe, a brake controlling valve device operated by variations in brake pipe pressure for effecting the application and release of the brakes, said brake controlling valve device including a piston which is at all times subject to brake pipe pressure, means controlled by said piston for effecting a graduated release of the brakes and means also controlled by said piston for effecting a full release of the brakes, and a valve shiftable to one position for rendering the graduated release means effective and shiftable to another position for rendering the direct release means effective.

74. In a fluid pressure brake, in combination, a brake pipe, a brake controlling valve device operated by variations in brake pipe pressure for effecting the application and release of the brakes, said brake controlling valve device including a piston which is at all times subject to brake pipe pressure, means controlled by said piston for effecting a graduated release of the brakes and means also controlled by said piston for effecting a full release of the brakes, a passage through which fluid discharged in graduating the release of the brakes is adapted to flow, another passage through which fluid discharged in effecting the full release of the brakes is adapted to flow, and means selectively operative to prevent the flow of fluid through one or the other of said passages.

75. In a fluid pressure brake, in combination, a brake pipe, a brake controlling valve device operated by variations in brake pipe pressure for effecting the application and release of the brakes, said brake controlling valve device including a piston which is at all times subject to brake pipe pressure, means controlled by said piston for effecting a graduated release of the brakes and means also controlled by said piston for effecting a full release of the brakes, and means operative to selectively render either of the release means effective while the other release means is rendered ineffective.

76. In a fluid pressure brake, in combination, a brake pipe, a brake controlling valve device operated by variations in brake pipe pressure for effecting the application and release of the brakes, said brake controlling valve device including a piston which is at all times subject to brake pipe pressure, means controlled by said piston for effecting a graduated release of the brakes and means also controlled by said piston for effecting a full release of the brakes, a passage through which fluid discharged in graduating the release of the brakes is adapted to flow, another passage through which fluid discharged in effecting the full release of the brakes is adapted to flow, and means operative to one position to prevent the flow of fluid through one passage to render the graduated release means ineffective and operative to another position to prevent the flow of fluid through the other passage to render the full release means ineffective.

77. In a fluid pressure brake, in combination, a brake pipe, a brake controlling valve device comprising a main slide valve, a graduating slide valve having movement relative to the main slide valve and a piston subject to variations in brake pipe pressure for operating said valves, said graduating valve controlling a communication through which fluid is adapted to be released to effect a release of the brakes and the main valve controlling a communication through which fluid is adapted to be released to effect a release of the brakes, and means operative to selectively prevent flow of fluid through either communication when the other permits flow.

78. In a fluid pressure brake, in combination, a brake pipe, a brake controlling valve device comprising a main slide valve, a graduating slide valve having movement relative to the main slide valve and a piston subject to variations in brake pipe pressure for operating said valves, said graduating valve controlling a communication through which fluid is adapted to be released in effecting a graduated release of the brakes and a main valve controlling a communication through which fluid is adapted to be released in effecting a full release of the brakes, and means operative to select either of said communications for use and to render the other ineffective.

79. In a fluid pressure brake, in combination, a brake pipe, a brake controlling valve device operative upon a reduction in brake pipe pressure to supply fluid under pressure to effect an application of the brakes, a communication through which fluid under pressure supplied by the brake controlling valve device flows, a pressure build-up control valve mechanism interposed in said communication and operative according to the pressure of fluid in the communication, means operative to one position to establish a by-pass communication around said mechanism through which fluid under pressure supplied by the brake controlling valve device flows without control by the mechanism and operative to another position for cutting-off said by-pass communication to render the mechanism effective.

80. In a fluid pressure brake, in combination, a brake controlling valve device comprising a triple valve portion and an emergency valve portion operative upon an emergency reduction in brake pipe pressure for supplying fluid under pressure to effect an emergency application of the brakes, means operative according to the operation of said emergency valve device and the pressure of fluid supplied by said valve devices for controlling the build up of the pressure of fluid supplied by the valve devices, means operative to one position to establish a communication through which fluid supplied by said valve devices flows without regulation by the pressure build up control means and operative to another position to cut-off said communication to thereby render the pressure build up control means effective.

81. In a fluid pressure brake, in combination, a brake pipe, a brake controlling valve device operative upon a reduction in brake pipe pressure to supply fluid under pressure to effect an application of the brakes, a pressure build-up control valve mechanism, a passage through which fluid under pressure supplied by the brake controlling valve device flows to the pressure build-up control valve mechanism and having a branch passage, a passage through which fluid under pressure flowing through said build-up control valve mechanism flows to effect the application of the brakes and having a branch passage, and means operative to one position to connect said branch passages to render the build-up control valve mechanism ineffective to control the flow of fluid in effecting an application of the brakes and operative to another position to cut-off communication between the branch passages.

82. In a fluid pressure brake, in combination, a brake pipe, a brake controlling valve device operative upon a reduction in brake pipe pressure to supply fluid under pressure to effect an application of the brakes, a pressure build-up control valve mechanism, a passage through which fluid under pressure supplied by the brake controlling valve device flows to the pressure build-up control valve mechanism and having a branch passage, a passage through which fluid under pressure flowing through said build-up control valve mechanism flows to effect the application of the brakes and having a branch passage, and valve means operative to selectively establish or cut off the communication between said branch passages.

83. In a fluid pressure brake, in combination, a brake pipe, brake apparatus comprising a plurality of brake controlling devices including a non-selectable triple valve device having an actuating piston which is at all times subject to brake pipe pressure and also including a non-selectable emergency valve device having an actuating piston which is at all times subject to brake pipe pressure, both of said pistons being responsive to variations in brake pipe pressure in each of a plurality of classes of train service to control the application and release of the brakes, selectable control devices also included in the brake controlling devices adapted to be cut into cooperative relationship with said triple and emergency valve devices to condition the apparatus for a particular class of train service and adapted to be cut out of cooperative relationship with said triple and emergency valve devices to condition the apparatus for another class of train service, and means operative to cut said selectable devices into or out of cooperative relationship with said triple and emergency valve devices.

84. In a fluid pressure brake, in combination, a brake pipe, brake apparatus comprising a plurality of brake controlling devices including a non-selectable triple valve device having an actuating piston which is at all times subject to brake pipe pressure and also including a non-selectable emergency valve device having an actuating piston which is at all times subject to brake pipe pressure, both of said pistons being responsive to variations in brake pipe pressure in each of a plurality of classes of train service to control the application and release of the brakes, selectable control devices also included in the brake controlling devices adapted to be cut into or out of cooperative relationship with said triple and emergency valve devices for conditioning the apparatus for one or another of said classes of train service, and means operative to selectively cut said selectable control devices into or out of cooperative relationship with the triple and emergency valve devices.

85. In a fluid pressure brake, in combination, a brake pipe, brake apparatus comprising a pair of brake controlling valve devices each including an actuating piston subject at all times to brake pipe pressure and responsive to variations in fluid pressure for controlling the application and release of the brakes, selectable brake control means associated with each brake controlling valve device and cooperating therewith to provide a selected braking operation upon operation of the corresponding brake controlling valve device, and means for cutting said selectable brake control means into and out of cooperative relation with the corresponding brake controlling valve device.

86. In a fluid pressure brake, in combination, a brake pipe, a brake controlling valve device operative upon a decrease in brake pipe pressure for effecting an application of the brakes and having quick service means operative upon the initial brake pipe reduction of one brake application to vent fluid from the brake pipe, means for preventing operation of said quick service means upon succeeding reductions in brake pipe pressure in said brake application, and additional quick service means for venting fluid from the brake pipe upon said succeeding reductions in brake pipe pressure.

87. In a fluid pressure brake, in combination, a brake pipe, a brake controlling valve device operative upon a decrease in brake pipe pressure for effecting an application of the brakes and having quick service means operative upon the initial brake pipe reduction of one brake application to vent fluid from the brake pipe, means operative upon a predetermined increase in fluid under pressure being supplied by said brake controlling valve device in effecting the application of the brakes for rendering the quick service means ineffective to vent fluid from the brake pipe upon succeeding reductions in brake pipe pressure in said application, and additional quick service means for venting fluid from the brake pipe upon said succeeding reductions in brake pipe pressure.

88. In a fluid pressure brake, in combination, a brake pipe, a brake controlling valve device operative upon a decrease in brake pipe pressure for effecting an application of the brakes and having quick service means operative upon the initial brake pipe reduction of one brake application to vent fluid from the brake pipe, means for preventing operation of said quick service means upon succeeding reductions in brake pipe pressure in said brake application, and additional quick service means for venting fluid from the brake pipe upon said succeeding reductions in brake pipe pressure, said brake controlling valve device being operative upon the completion of each of said reductions in brake pipe pressure for rendering said additional quick service means ineffective.

89. In a fluid pressure brake, in combination, a brake pipe, a brake controlling valve device operative upon a decrease in brake pipe pressure to a position for effecting an application of the brakes and having quick service means for venting fluid under pressure from the brake pipe in said position, means for rendering said quick service means ineffective when the brake application exceeds a predetermined degree, and additional quick service means for venting fluid under pressure from the brake pipe when the brake controlling valve device moves to said position upon a subsequent decrease in brake pipe pressure with the brake application in excess of said predetermined degree.

90. In a fluid pressure brake, in combination, a brake pipe, a brake controlling valve device operative upon a decrease in brake pipe pressure to a position for effecting an application of the brakes and having quick service means for venting fluid under pressure from the brake pipe in said position, means for rendering said quick service means ineffective when the brake application exceeds a predetermined degree, said brake controlling valve device being operative upon the termination of the decrease in brake pipe pressure to a position for limiting the brake application, and additional quick service means for venting fluid from the brake pipe upon movement of said brake controlling valve device from the latter position to the former position in response to a succeeding reduction in brake pipe pressure.

91. In a fluid pressure brake, in combination, a brake pipe, a brake controlling valve device operative upon a decrease in brake pipe pressure to a position for effecting an application of the brakes and having quick service means for venting fluid under pressure from the brake pipe in said position, means operative when the brake application has attained a predetermined value for rendering said quick service means ineffective, and additional quick service means for venting fluid from the brake pipe upon each and every reduction in brake pipe pressure in graduating the brakes on and in cycling operations.

CLYDE C. FARMER.
ELLIS E. HEWITT.